United States Patent
Yamada et al.

(10) Patent No.: US 9,945,987 B2
(45) Date of Patent: Apr. 17, 2018

(54) TRANSPARENT FILM, AND METHOD FOR PRODUCING TRANSPARENT FILM

(71) Applicant: Sharp Kabushiki Kaisha, Sakai, Osaka (JP)

(72) Inventors: Nobuaki Yamada, Sakai (JP); Kenichiro Nakamatsu, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/515,652

(22) PCT Filed: Sep. 30, 2015

(86) PCT No.: PCT/JP2015/077653
§ 371 (c)(1),
(2) Date: Mar. 30, 2017

(87) PCT Pub. No.: WO2016/056436
PCT Pub. Date: Apr. 14, 2016

(65) Prior Publication Data
US 2017/0299780 A1    Oct. 19, 2017

(30) Foreign Application Priority Data

Oct. 7, 2014 (JP) .................................. 2014-206552
Oct. 7, 2014 (JP) .................................. 2014-206553

(51) Int. Cl.
*G02B 1/00* (2006.01)
*G02B 1/18* (2015.01)
*G02B 1/118* (2015.01)

(52) U.S. Cl.
CPC ................ *G02B 1/18* (2015.01); *G02B 1/118* (2013.01)

(58) Field of Classification Search
CPC ...... G02B 1/18; G02B 1/118; G02B 27/0006; B05D 5/00; B32B 3/00
(Continued)

(56) References Cited

U.S. PATENT DOCUMENTS

2012/0156431 A1* 6/2012 Suto ..................... G02B 1/118
                                                              428/141

FOREIGN PATENT DOCUMENTS

JP    H8227006 A    9/1996
JP    H8292301 A    11/1996
(Continued)

OTHER PUBLICATIONS

International Search Report PCT/ISA/210 for International Application No. PCT/JP2015/077653 dated Dec. 15, 2015.

Primary Examiner — Euncha Cherry
(74) Attorney, Agent, or Firm — Harness, Dickey & Pierce, P.L.C.

(57) ABSTRACT

The present invention provides a transparent film with an excellent anti-fog property. The transparent film of the present invention includes: a base film provided on a surface with projections formed at a pitch equal to or shorter than the wavelength of visible light; and hydrophilic fine particles each having a particle size in the range of 15% to 50% of the pitch of the projections, the hydrophilic fine particles being held in gaps between the projections while being in contact with the projections, the hydrophilic fine particles held in the gaps between the projections being separated by spaces from bottoms of the gaps, the spaces forming channels on the surface.

20 Claims, 10 Drawing Sheets

(58) Field of Classification Search
USPC .......................................................... 359/507
See application file for complete search history.

(56)     References Cited

FOREIGN PATENT DOCUMENTS

| JP | 2007/322767 A | 12/2007 |
| JP | 4420726 B2 | 2/2010 |
| JP | 2015/077793 A | 4/2015 |

* cited by examiner (a)

(b)

(c)

(d)

(a)

(b)

(c)

(d)

(a)

(b)

(c)

(a)

(b)

(c)

(d)

(e)

(a)

(b)

(c)

ns and
methods for producing a transparent film. The present invention more specifically relates to a hydrophilic transparent film and a method for producing the transparent film.

TRANSPARENT FILM, AND METHOD FOR PRODUCING TRANSPARENT FILM

TECHNICAL FIELD

The present invention relates to transparent films and methods for producing a transparent film. The present invention more specifically relates to a hydrophilic transparent film and a method for producing the transparent film.

BACKGROUND ART

Transparent films having a nanometer-sized projection/recess structure (nanostructure) have been considered for use in various products such as windows of automobiles and windows of showcase freezers. Patent Literature 1, for example, suggests a configuration in which such a transparent film is used as an anti-reflection film. Known transparent films include hydrophobic or hydrophilic ones, and hydrophilic ones are known to utilize the surface tension of water having entered the gaps (recesses) between the projections to exhibit hydrophilicity, and utilize the capillary action to spread water. Examples of the hydrophilic transparent films include a configuration suggested in Patent Literature 2 in which the projection/recess structure is filled with a hydrophilic polymer.

Also, hydrophilic components allow water droplets to spread on their surface, and are therefore considered for use in the automobile industry and construction industry, for example. Examples of the hydrophilic components include configurations suggested in Patent Literatures 3 and 4 which are utilized in the windows and door mirrors of automobiles.

CITATION LIST

Patent Literature

Patent Literature 1: JP 2007-322767 A
Patent Literature 2: JP 4420726 B
Patent Literature 3: JP H8-292301 A
Patent Literature 4: JP H8-227006 A

SUMMARY OF INVENTION

Technical Problem

Conventional hydrophilic transparent films (components), however, provide an insufficient rate for water to spread, and therefore can be improved in terms of an increase in the anti-fog property.

Patent Literature 1 discloses a configuration in which nanoparticles having a given refractive index are placed in the recesses constituting the projection/recess structure. The invention disclosed in Patent Literature 1 including nanoparticles placed in the recesses, however, cannot utilize the capillary action sufficiently and therefore provides an insufficient rate for water to spread. Also, since at least part of the surface of each nanoparticle is covered with the binder, their hydrophilic function is hindered by the binder. The invention can therefore be improved in terms of an increase in the anti-fog property.

Patent Literature 2 discloses a configuration in which a hydrophilic polymer (starch compound) is placed in the recesses constituting the projection/recess structure. The invention disclosed in Patent Literature 2 including the starch compound densely placed in the recesses, however, cannot utilize the capillary action and therefore provides an insufficient rate for water to spread. The invention can therefore be improved in terms of an increase in the anti-fog property.

Patent Literature 3 discloses a configuration in which the metal oxide formed on the surface of the glass substrate contains a hydrophilic organic compound. The invention disclosed in Patent Literature 3, however, is probably likely to exhibit decreased hydrophilicity because the hydrophilic organic compound tends not to stay on the surface and is easily wiped off with a solvent such as water. The invention can therefore be improved in terms of an increase in the anti-fog property.

Patent Literature 4 discloses a configuration in which a hydrophilic low-molecular organic compound is placed in the metal oxide projection/recess structure formed on the surface of the glass substrate. The invention disclosed in Patent Literature 4, however, is probably likely to exhibit decreased hydrophilicity because the hydrophilic low-molecular organic compound tends not to stay on the surface and is easily wiped off with a solvent such as water. Also, the gaps (recesses) between the projections are arranged in a discontinuous (not forming channels), separate pattern (dot-like pattern), and thus provide an insufficient rate for water to spread. The invention can therefore be improved in terms of an increase in the anti-fog property.

The present invention has been made in view of the above current state of the art, and aims to provide a transparent film having an excellent anti-fog property and a method for producing the transparent film.

Solution to Problem

The inventors of the present invention have made various studies on transparent films having an excellent anti-fog property, and have focused on utilization of the capillary action in the base film having a nanostructure. As a result, they have found that the capillary action can be significantly achieved by arranging the hydrophilic fine particles with spaces from the respective bottoms of the gaps between the projections constituting the nanostructure, such that the spaces form channels. That is, they have found that the rate at which water spreads can be significantly increased by utilizing the capillary action of the spaces formed between the hydrophilic fine particles and the bottoms of the gaps between the projections. They have also found that in the case that the hydrophilic fine particles are held in the gaps between the projections while being in contact with the projections, the intermolecular forces (Van der Waals forces) between the hydrophilic fine particles and the projections can be utilized to fix the hydrophilic fine particles in the gaps between the projections without hindrance to the hydrophilic function. Thereby, the inventors have arrived at a solution of the above problems, completing the present invention.

One aspect of the present invention may be a transparent film (also referred to as a first transparent film of the present invention) including: a base film provided on a surface with projections formed at a pitch equal to or shorter than the wavelength of visible light; and hydrophilic fine particles each having a particle size in the range of 15% to 50% of the pitch of the projections, the hydrophilic fine particles being held in gaps between the projections while being in contact with the projections, the hydrophilic fine particles held in the gaps between the projections being separated by spaces from bottoms of the gaps, the spaces forming channels on the surface.

Another aspect of the present invention may be a method for producing the first transparent film of the present invention, including the steps of: applying a dispersion with the hydrophilic fine particles dispersed in a solvent to the base film; and drying the applied dispersion to evaporate the solvent.

As a result of the various studies on transparent films having an excellent anti-fog property, the inventors of the present invention have also focused on a configuration including a base film having a nanostructure and a hydrophilic ionic liquid in combination. The inventors have then found that with a configuration in which the gaps between the projections constituting the nanostructure form channels and an ionic liquid is placed in the gaps between the projections, the ionic liquid tends not to be wiped off and therefore the hydrophilic function can be significant. That is, they have found that the rate at which water spreads can be significantly increased by utilizing the hydrophilic function of the ionic liquid placed in the gaps between the projections which form channels. Thereby, the inventors have arrived at another solution of the above problems, completing the present invention.

Yet another aspect of the present invention may be a transparent film (also referred to as a second transparent film of the present invention) including: a base film provided on a surface with projections formed at a pitch equal to or shorter than the wavelength of visible light, with gaps between the projections forming channels; and a hydrophilic ionic liquid placed in the gaps between the projections.

Yet another aspect of the present invention may be a method for producing the second transparent film of the present invention, including the steps of: applying a solution of the ionic liquid and a solvent to the base film; and drying the applied solution to evaporate the solvent.

Advantageous Effects of Invention

The present invention can provide a transparent film having an excellent anti-fog property and a method for producing the transparent film.

DESCRIPTION OF EMBODIMENTS

<First Transparent Film of the Present Invention>

Hereinafter, the first transparent film of the present invention is described in more detail based on Embodiments 1 to 3 (Examples 1 to 5) with reference to the drawings. The embodiments (examples), however, are not intended to limit the scope of the first transparent film of the present invention. The configurations of the embodiments (examples) may appropriately be combined or modified within the spirit of the present invention.

Embodiment 1

A transparent film of Embodiment 1 includes a base film and hydrophilic fine particles.

(1) Structure of Transparent Film

Figure 1:
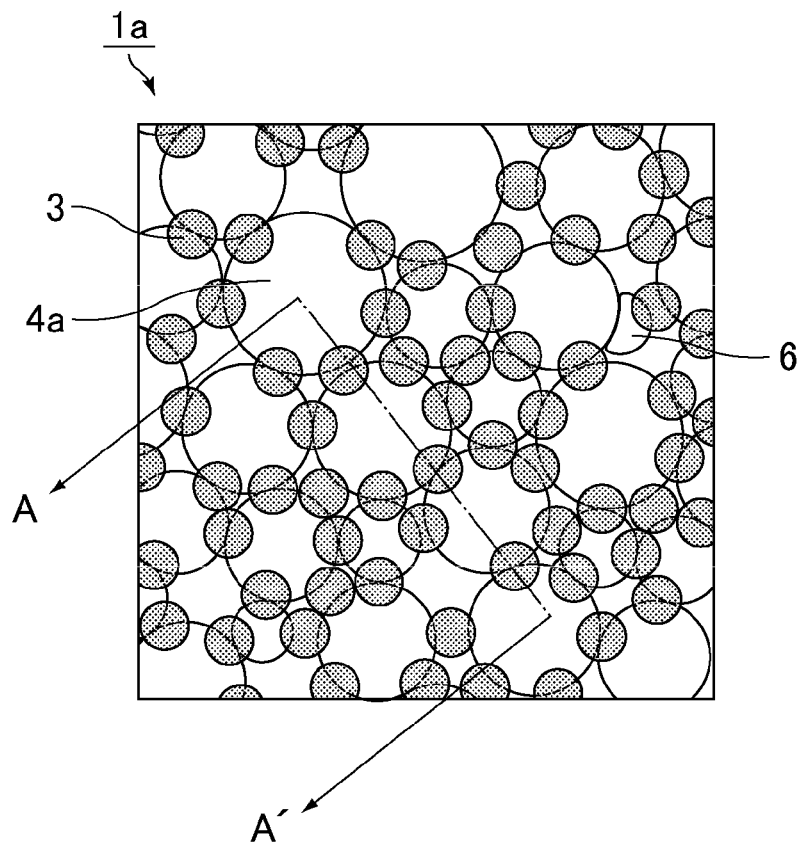
FIG. 1 is a schematic plan view of a transparent film of Embodiment 1.
Figure 2:
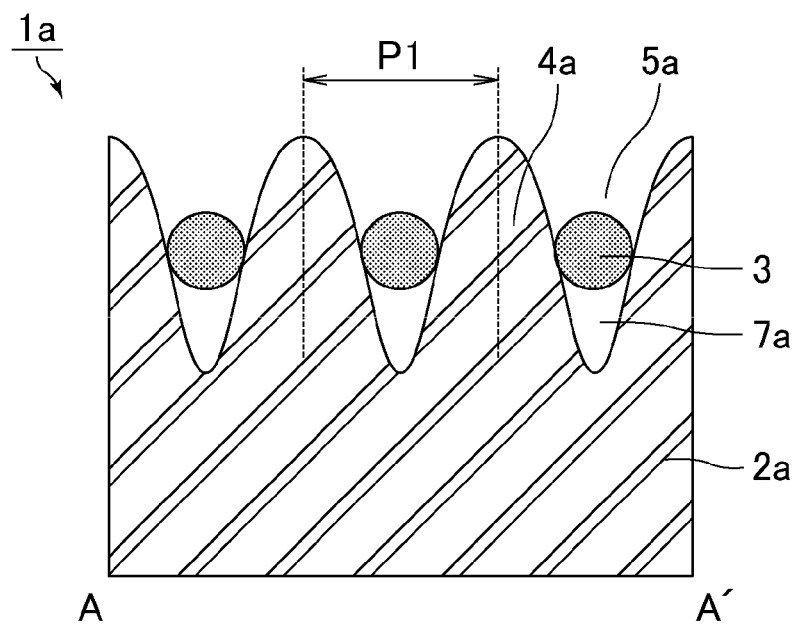
FIG. 2 is a schematic cross-sectional view of a cross section taken along the line A-A' in FIG. 1.

The structure of the transparent film of Embodiment 1 is described with reference to FIG. 1 and FIG. 2. FIG. 1 is a schematic plan view of a transparent film of Embodiment 1. FIG. 2 is a schematic cross-sectional view of a cross section taken along the line A-A' in FIG. 1. As illustrated in FIG. 1 and FIG. 2, a transparent film 1a includes a base film 2a and hydrophilic fine particles 3. The base film 2a corresponds to an anti-reflection film provided on a surface with projections (protrusions) 4a formed at a pitch (distance between the tops of the adjacent projections 4a) P1 equal to or shorter than the wavelength of visible light, i.e., an anti-reflection film having a moth-eye structure. The transparent film 1a therefore can exhibit a low-reflection property with the moth-eye structure. The hydrophilic fine particles 3 each have a particle size in the range of 15% to 50% of the pitch P1 of the projections 4a constituting the moth-eye structure, and are held in gaps 5a between the projections 4a while being in contact with the adjacent projections 4a at two sites and separated by spaces 7a from the bottoms of the gaps 5a between the projections 4a. That is, the hydrophilic fine particles 3 are in contact with both of the adjacent projections 4a, and the total number of the contact sites is two. The spaces 7a are arranged in a mesh pattern to form channels on the surface of the transparent film 1a. The expression that the spaces 7a form channels as used herein means that the spaces 7a form channels to exert the capillary action such that the water can spread. Here, the spaces 7a are preferably arranged such that the heights of the water surfaces can be uniform on the surface of the transparent film 1a. The spaces 7a are preferably continuous from one end of the transparent film 1a to the other end, and are preferably arranged in a mesh pattern. The solid lines of white circles in FIG. 1 indicate the outlines of the bottoms of the projections 4a. FIG. 1 and FIG. 2 each clearly illustrate the moth-eye structure and the hydrophilic fine particles 3 in an enlarged view. In the actual transparent film 1a, the projections 4a and the hydrophilic fine particles 3 are significantly small (smaller than the wavelength of visible light) relative to the area of the transparent film 1a. The moth-eye structure and the hydrophilic fine particles 3 therefore cannot be identified as illustrated in FIG. 1 and FIG. 2 by the naked eye or with an optical device such as an optical microscope.

The projections 4a may each have any shape that tapers toward the end (tapered shape). Examples of the shape include shapes formed by a pillar-shaped bottom portion and a hemispherical top portion (hereinafter, also referred to as bell shapes) and conical shapes (cone shapes, circular cone shapes). Also, the projections 4a may have a shape with branched projections. The branched projections refer to projections formed at an irregular pitch in the anodizing and etching for formation of a moth-eye structure, such as the projections (branched projections 6) illustrated in FIG. 1. For efficient placement of the hydrophilic fine particles 3, the projections 4a each preferably have a bell shape thickening toward the bottom to give a narrow bottom portion to the gaps 5a between the projections 4a as illustrated in FIG. 2. Although the bottoms of the gaps 5a between the projections 4a each are curved in FIG. 2, the bottoms may each form a horizontal line without curvature.

The pitch P1 of the projections 4a may be any pitch equal to or shorter than the wavelength (780 nm) of visible light. For sufficient prevention of optical phenomena such as a moiré pattern and iridescent unevenness, the pitch P1 is preferably in the range of 100 nm to 400 nm, more preferably in the range of 100 nm to 200 nm. The pitch P1 of the projections 4a as used herein refers to the average of the distances between all the adjacent projections, excluding the branched projections, within a 1-μm square region on a scanning electron microscope (SEM) photograph (plan picture) taken with a SEM (trade name: S-4700) available from Hitachi, Ltd. as a measurement device.

The height of the projections 4a may be any height that is designed to retain the hydrophilic fine particles 3 within the gaps 5a between the projections 4a, but is preferably 50 nm or higher. Furthermore, for simultaneous achievement of the later-described suitable aspect ratio of the projections 4a, the height of the projections 4a is preferably in the range of 50 nm to 600 nm, more preferably in the range of 100 nm to 300 nm. The height of the projections 4a as used herein refers to the average of the heights of 10 projections formed in a continuous row, excluding the branched projections, on a SEM photograph (cross-sectional picture) taken with the SEM (trade name: S-4700) available from Hitachi, Ltd. as a measurement device. Here, projections with a defect or deformation (e.g., portions deformed in preparation of a sample for SEM photographs) are excluded from the 10 projections. Samples for SEM photographs are taken in a region without specific defects of anti-reflection films. For example, in the case of a continuously produced rolled anti-reflection film, a sample is taken in the vicinity of the center of the film.

The aspect ratio of the projections 4a is not particularly limited, but is preferably 1.5 or smaller in terms of the processability of the moth-eye structure. If the aspect ratio of the projections 4a is too large (the projections 4a are elongated), the projections may stick to each other (sticking) or deteriorate the transfer condition for formation of the moth-eye structure (e.g., the projections may clog the female mold for the moth-eye structure or cause winding of the female mold). For sufficient prevention of optical phenomena such as a moiré pattern and iridescent unevenness and achievement of favorable reflectance characteristics, the aspect ratio of the projections 4a is preferably in the range of 0.8 to 1.5. The aspect ratio of the projections 4a as used herein refers to a ratio (height/pitch P1) of the height of the projections 4a to the pitch P1 of the projections 4a which have been determined as described above with the SEM (trade name: S-4700) available from Hitachi, Ltd. as a measurement device.

The projections 4a may be arranged in any pattern, and may be arranged randomly or regularly. For sufficient prevention of occurrence of a moiré pattern, the projections 4a are preferably arranged randomly as illustrated in FIG. 1.

In order to form the projections 4a as described above, the material of the projections 4a is preferably resin. For sufficient increase in the hydrophilicity of the transparent film, the projections 4a each preferably have a hydrophilic surface. If the projections 4a each have a hydrophobic surface, the transparent film may not allow water droplets generated by condensation to spread easily, and may fail to achieve a sufficient anti-fog property. A dispersion containing the hydrophilic fine particles 3 dispersed therein is to be applied to the base film 2a in production of the transparent film of Embodiment 1, and the solvent for the dispersion is typically a polar solvent such as water, ethanol, an alcohol-based solvent, or an ester-based solvent. For this reason, in order to also cause the dispersion to spread efficiently to the entire base film 2a, the projections 4a each preferably have a hydrophilic surface. If the projections 4a each have a hydrophobic surface, the dispersion may not be well applied to the gaps 5a between the projections 4a due to the hydrophobicity as well as the lotus effect of the moth-eye structure. The surfaces of the projections 4a can be made hydrophilic by, for example, a method of introducing hydrophilic functional groups to the resin material in the monomeric state of the projections 4a, a method of curing a resin material and modifying the cured surface with electron beam irradiation or plasma irradiation to form —OH groups or —COOH groups on the surface, or a method of introducing ion-exchange groups (e.g., —COOH groups) to the surfaces of the projections 4a. With ion-exchange groups introduced to the surfaces of the projections 4a, the ions are fixed on the surfaces of the projections 4a, so that the durability of the projections 4a can be increased. Furthermore, even in the case that water droplets are generated by condensation on the surfaces of the projections 4a, the ionic functional groups on the surfaces of the projections 4a lose touch with the surfaces to become ions, causing freezing-point depression to decrease the temperature at which frost forms. That is, frost forms once on the surfaces of the projections 4a as the workpiece is cooled, but can be controlled to disappear at a lower temperature as the temperature is increased. Thereby, in the case of applying such a transparent film to the window of a showcase freezer, for example, the lower end of the operating temperature limit can be further decreased. The term hydrophilic as used herein refers to the condition where the contact angle of water is 30° or smaller. The contact angle is the average of contact angles measured at three points with a portable contact angle meter (trade name: PCA-1) available from Kyowa Interface Science Co., Ltd. as a measurement device, using the θ/2 method (calculated from $\theta/2 = \arctan(h/r)$, wherein θ represents a contact angle, r represents the radius of a droplet, and h represents the height of the droplet). Here, the first measurement point shall be the center of the sample, and the second and third measurement points shall be two points that are each away from the first measurement point by 20 mm or longer and are symmetrical with respect to the first measurement point.

Example of the hydrophilic fine particles 3 include those obtained by hydrophilizing titanium oxide ($TiO_2$) or aluminum oxide ($Al_2O_3$) and silica fine particles. For sufficient increase in the hydrophilicity, silica fine particles are preferred.

The shape of the hydrophilic fine particles 3 may be any shape such as a sphere, a pillar (fibrous shape), or an oval sphere. For efficient placement of the hydrophilic fine particles 3, the shape of the hydrophilic fine particles 3 is preferably a sphere as illustrated in FIG. 2.

The particle size of the hydrophilic fine particles 3 may be any size in the range of 15% to 50% of the pitch P1 of the projections 4a. For efficient utilization of the capillary action of the spaces 7a and sufficient increase in the anti-fog property, the particle size is preferably in the range of 15% to 25% of the pitch P1 of the projections 4a. If the particle size of the hydrophilic fine particles 3 is smaller than 15% of the pitch P1 of the projections 4a, the spaces 7a are too small to exert the capillary action sufficiently, leading to an insufficient rate for water to spread. In particular, if the particle size of the hydrophilic fine particles 3 is 5 nm or smaller, the channels formed by the spaces 7a are extremely narrow and allow water to spread at a very low rate. If the particle size of the hydrophilic fine particles 3 is greater than 50% of the pitch P1 of the projections 4a, the hydrophilic fine particles 3 flow out of the gaps 5a between the projections 4a, so that the hydrophilic fine particles 3 are easily wiped off. The particle size of the hydrophilic fine particles 3 as used herein refers to the average of the particle sizes of 20 hydrophilic fine particles on SEM photographs (plan picture and cross-sectional picture) taken with the SEM (trade name: S-4700) available from Hitachi, Ltd. as a measurement device. Here, hydrophilic fine particles with a defect or deformation are excluded from the 20 hydrophilic fine particles. The particle size as used herein is the maximum length of the lengths in all the directions of each of the hydrophilic fine particles 3. For example, in the case that the hydrophilic fine particles 3 each have a spherical shape, the particle size is the length corresponding to the diameter of the particle, while in the case that the hydrophilic fine particles 3 each have an oval spherical shape, the particle size is the longest of the major axis and a diameter in the direction perpendicular to the major axis.

The hydrophilic fine particles 3 preferably exhibit a surface tension equal to or higher than the surface tension of the projections 4a in a measurement with water. With an increased surface tension, the contact angle decreases to further increase the hydrophilicity of the hydrophilic fine particles 3. The surface tension is measured by a penetration rate method (a method of filling a column with the test substance at a constant pressure, and infiltrating water into the substance to determine the surface tension of the substance from the formula: $l^2/t=(r*\gamma \cos \theta)/2\eta$, wherein l represents the water penetration height, t represents time, r represents the capillary radius of the substance, $\gamma$ represents the surface tension, $\eta$ represents the viscosity of water, and $\theta$ represents the contact angle).

For efficient utilization of the capillary action and sufficient increase in the anti-fog property, the spaces 7a are preferably formed up to a position corresponding to 20% or lower of the depth of the gaps 5a between the projections 4a, more preferably up to a position corresponding to 0.5% to 10% of the depth of the gaps 5a between the projections 4a. The range in which the spaces 7a are formed herein is the average of the ratios of L1 to L2 expressed as a percentage (100×L1/L2(%)), L1 and L2 being measured at five points with the SEM (trade name: S-4700) available from Hitachi, Ltd. as a measurement device. Here, L1 is the distance between the bottom of the undermost hydrophilic fine particle 3 and the bottom of the gap 5a between the projections 4a (distance in the height direction of the projections 4a) and L2 is the depth of the gap 5a between the projections 4a. The measurements shall be made at points without defects, stains, and deformation.

The transparent film of Embodiment 1 has a configuration in which one hydrophilic fine particle 3 is placed in each gap 5a between the projections 4a as illustrated in FIG. 2, but may have a configuration in which multiple hydrophilic fine particles 3 are placed in each gap 5a between the projections 4a. In this case, each hydrophilic fine particle 3 shall be in contact with a projection 4a, and is preferably in contact with both of the adjacent projections 4a such that the total number of contact sites of each hydrophilic fine particle 3 is at least two. For sufficient, strong fixation of the hydrophilic fine particles 3 in the gaps 5a between the projections 4a, the number of the hydrophilic fine particles 3 being in contact with the adjacent projections 4a at least at two sites as a percentage of all the hydrophilic fine particles 3 is in the range of 30% to 100%, more preferably in the range of 60% to 100%. Although FIG. 2 illustrates a configuration in which the total number of contact sites between the hydrophilic fine particles 3 and the adjacent projections 4a is two, the total number of contact sites may be one or may be three or more. Examples of the configuration in which the total number of contact sites is three or more include, for example in FIG. 2, a configuration in which the hydrophilic fine particles 3 have projections and recesses on the surface, and a configuration in which the bottoms of the gaps 5a between the projections 4a are horizontal and spherical hydrophilic fine particles 3 are placed in the gaps. The number of contact sites between the hydrophilic fine particles 3 and the projections 4a herein is determined from an SEM photograph (plan picture) taken with the SEM (trade name: S-4700) available from Hitachi, Ltd. as a measurement device. Specifically, in the case that the hydrophilic fine particles 3 are aligned alongside the respective gaps 5a between the projections 4a (alongside both of the adjacent projections 4a) with one particle in each gap on the SEM photograph, the total number of contact sites is determined to be two or more, while in the case that the hydrophilic fine particles 3 overlap each other and are aligned alongside one of the adjacent projections 4a, the number of contact sites is determined to be one. The number of the hydrophilic fine particles 3 in contact with the adjacent projections 4a at least at two sites as a percentage of all the hydrophilic fine particles 3 is the ratio of the number of the hydrophilic fine particles 3 with the number of contact sites determined by the above method of two or more in a 2-μm square region to the number of all the hydrophilic fine particles 3 present in the region, expressed as a percentage. The 2-μm square region shall be selected from regions without defects, stains, and deformation.

The transparent film of Embodiment 1 can provide an increased rate for water to spread because of the capillary action of the spaces 7a, and therefore can achieve an excellent, anti-fog property. Furthermore, the transparent film can also achieve the following effects (i) to (iv).

(i) Since the hydrophilic fine particles 3 are placed in the respective gaps 5a between the projections 4a while being in contact with the adjacent projections 4a at two sites, the intermolecular forces are present at the contact sites between the hydrophilic fine particles 3 and the projections 4a. Also, since the weight of the hydrophilic fine particles 3 is small, the forces of gravity acting on the hydrophilic fine particles 3 are weaker than the intermolecular forces. Hence, the hydrophilic fine particles 3 can be sufficiently strongly fixed in the respective gaps 5a between the projections 4a without a component such as a binder.

(ii) Since the above effect (i) enables fixation of the hydrophilic fine particles 3 in the respective gaps 5a between the projections 4a without a component such as a binder, the hydrophilic fine particles 3 can be effectively utilized without hindrance to the hydrophilic function.

(iii) Since the hydrophilic fine particles 3 are held in the respective gaps 5a between the projections 4a and therefore do not form large aggregates, a transparent film without white turbidity can be achieved.

(iv) Even when the transparent film 1a is stained, the stain can be wiped off with a solvent (for example, organic solvent). Here, since the intermolecular forces are present between the hydrophilic fine particles 3 and the projections 4a, the hydrophilic fine particles 3 are not wiped off. Also, for example, in the case that the material of the projections 4a is resin (polymer), the hydrophilic functional groups present on the surfaces of the hydrophilic fine particles 3 are chemically bonded to the above resin (polymer), which prevents the hydrophilic fine particles 3 from being wiped off. Moreover, for example, in the case that the transparent film 1a including the projections 4a having a height of 200 nm and formed at a pitch P1 of 200 nm is wiped with a cloth having a minimum fiber size of 400 nm, the fibers of the cloth cannot enter the gaps 5a between the projections 4a and the hydrophilic fine particles 3 are not wiped off.

(2) Process of Producing Transparent Film

Figure 3:
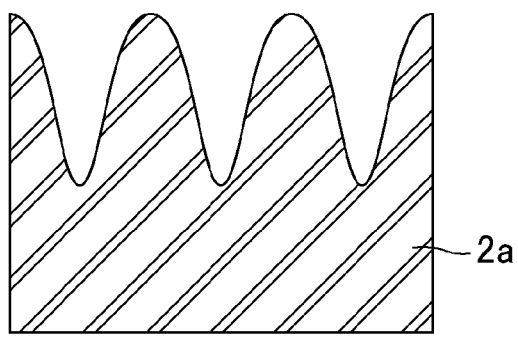
FIG. 3 includes schematic cross-sectional views for describing the process of producing the transparent film of Embodiment 1 (steps a to d).
Figure 3:
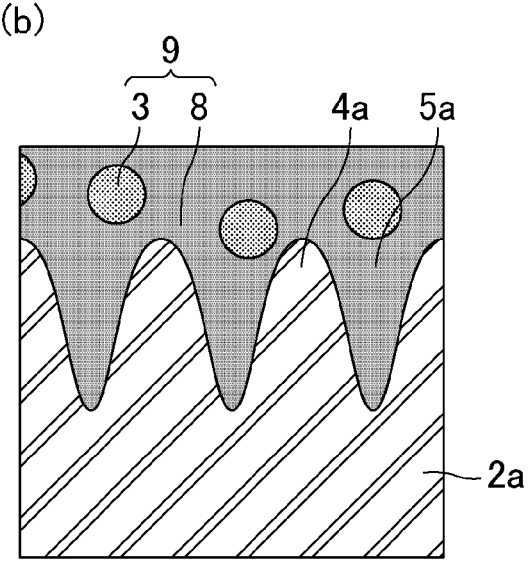
Figure 3:
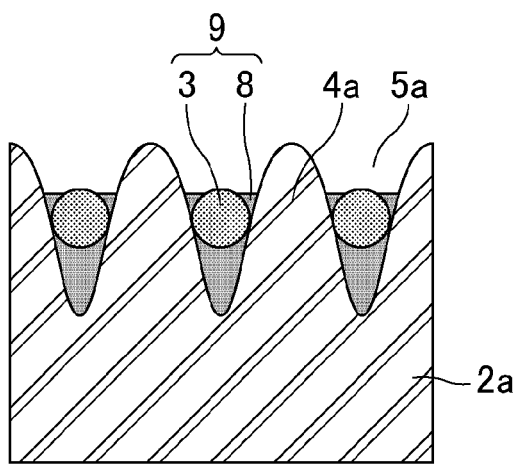
Figure 3:
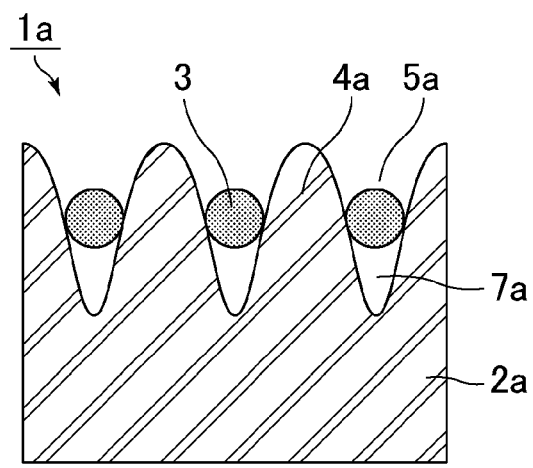

The process of producing the transparent film of Embodiment 1 is exemplified with reference to FIG. 3. FIG. 3 includes schematic cross-sectional views for describing the process of producing the transparent film of Embodiment 1 (steps a to d).

(a) Production of Base Film

First, a substrate is produced by sequentially forming a film of silicon dioxide ($SiO_2$) (insulating layer) and a film of pure aluminum on an aluminum base material. At this time, using the aluminum base material having a roll shape, for example, enables continuous formation of the insulating layer and the pure aluminum layer. The pure aluminum layer formed on the surface of the substrate is then alternately repetitively anodized and etched, so that a female mold or the moth-eye structure is produced. This female mold pattern is transferred to a photo-curable resin by optical nanoimprinting, whereby the base film 2a as illustrated in FIG. 3(a), i.e., an anti-reflection film having a moth-eye structure, is produced.

(b) Application of Dispersion

As illustrated in FIG. 3(b), a dispersion 9 in which the hydrophilic fine particles 3 are dispersed in a solvent 8 is applied to the base film 2a. The solvent 8 can be, for example, water, ethanol, an alcohol-based solvent (e.g., methyl alcohol), or an ester-based solvent (e.g., ethyl acetate, butyl acetate). The concentration of the hydrophilic fine particles 3 in the dispersion 9 is not particularly limited, but the hydrophilic fine particles 3 are preferably monodispersed. For monodispersion of the hydrophilic fine particles 3, the solvate stability is important, and the solvent 8 is preferably water. For example, in the case that the solvent 8 used is water and the hydrophilic fine particles 3 used are silica fine particles, the —OH groups on the surfaces of the silica fine particles may be replaced by ionic dissociation groups such as —COOH groups or $N^+R_1R_2R_3R_4$ groups, for fusion with water. The $N^+R_1R_2R_3R_4$ groups represent quaternary ammonium cations (R1, R2, R3, and R4 are the same or different functional groups. The functional groups are preferably C0-C2 short alkyl groups from the viewpoint of hydrophilicity. Preferably, the functional groups are free from fluorine atoms that may deteriorate the hydrophilicity. Also preferably, the functional groups may include a polar group such as a —OH group, —COOH group, ester bond, or ether bond. The functional groups may also have a structure in which a nitrogen atom is incorporated in a cyclic compound, such as an imidazole group). The shape of the hydrophilic fine particles 3 may be any shape such as a sphere, a pillar (fibrous shape), or an oval sphere. For efficient placement of the hydrophilic fine particles 3, the shape of the hydrophilic fine particles 3 is preferably a sphere. The particle size of the hydrophilic fine particles 3 may be any size in the range of 15% to 50% of the pitch P1 of the projections 4a. For efficient utilization of the capillary action of the spaces 7a and sufficient increase in the anti-fog property, the particle size is preferably in the range of 15% to 25% of the pitch P1 of the projections 4a. The method for applying the dispersion 9 may be any method such as a method of dropping a given amount of the dispersion in the given region of the base film 2a. The application region and amount of the dispersion 9 can appropriately be adjusted in accordance with the specifications of the base film 2a (e.g., shape of the projections 4a, the depth of the gaps 5a between the projections 4a).

(c) Drying

As illustrated in FIG. 3(c), the applied dispersion is dried to evaporate the solvent 8. The method for drying the dispersion 9 may be any method such as a method of leaving the workpiece in a clean bench. FIG. 3(c) illustrates the state where, in the course of evaporation of the solvent 8, the hydrophilic fine particles 3 are separately placed in the respective gaps 5a between the projections 4a and aligned.

(d) Completion of Transparent Film

After the above process (c), as illustrated in FIG. 3(d), the solvent 8 is completely evaporated to leave the hydrophilic fine particles 3 to adhere to the respective gaps 5a between the projections 4a, whereby a transparent film 1a is completed. In the transparent film 1a, the hydrophilic fine particles 3 are held in the respective gaps 5a between the projections 4a while being in contact with the adjacent projections 4a at two sites and separated by the spaces 7a from the bottoms of the respective gaps 5a between the projections 4a.

Hereinafter, examples are described in which the transparent film of Embodiment 1 was actually produced.

Example 1

Example 1 describes the case of using silica fine particles as the hydrophilic fine particles 3. The process of producing a transparent film of Example 1 is described below.

(a) Production of Base Film

First, a substrate was produced by sequentially forming a film of silicon dioxide ($SiO_2$) (insulating layer) and a film of pure aluminum on an aluminum base material. The pure aluminum layer formed on the surface of the substrate was then alternately repetitively anodized and etched, so that a female mold of the moth-eye structure was produced. This female mold pattern was transferred to a photo-curable resin by optical nanoimprinting, whereby the base film 2a (anti-reflection film having a moth-eye structure) was produced. The base film 2a had the following specifications.

Shape of projections 4a: bell shape
Pitch P1 of projections 4a: 200 nm

Height of projections 4a (depth of gaps 5a between projections 4a): 180 nm
Aspect ratio of projections 4a: 0.9
Contact angle of water on projections 4a: 10°
Total thickness of base film 2a (including height of projections 4a): 90 μm (b) Application of Dispersion The dispersion 9 was applied to the base film 2a. In the dispersion 9, the hydrophilic fine particles 3 used were silica fine particles (trade name: Sicastar®, model: 43-00-102) available from Corefront Corporation, and the solvent 8 used was water. The concentration of the hydrophilic fine particles 3 was 50 mg/ml, the particle size thereof was 100 nm (average), and the shape thereof was a sphere. The dispersion 9 was applied by a method of dropping 0.5 g of the dispersion in a 30-mm square region on the base film 2a.

(c) Drying

The dispersion 9 was dried by a method of leaving the workpiece in a clean bench.

(d) Completion of Transparent Film

After the above process (c), the transparent film of Example 1 was completed. One hydrophilic fine particle 3 was held in each gap 5a between the projections 4a, and the spaces 7a were formed up to a position corresponding to 3% of the depth of the gaps 5a between the projections 4a.

Example 2

Example 2 describes the case in which the particle size of the hydrophilic fine particles 3 in Example 1 was reduced. Since the transparent film and the production process thereof in Example 2 are the same as those in Example 1 except for this change, the same points are not described here.

In the dispersion 9, the hydrophilic fine particles 3 used were silica fine particles (trade name: sicastar, model: 43-00-501) available from Corefront Corporation, and the solvent 8 used was water. The concentration of the hydrophilic fine particles 3 was 25 mg/ml, the particle size thereof was 50 nm (average), and the shape thereof was a sphere. One hydrophilic fine particle 3 was held in each gap 5a between the projections 4a, and the spaces 7a were formed up to a position corresponding to 2% of the depth of the gaps 5a between the projections 4a.

Example 3

Example 3 describes the case in which the particle size of the hydrophilic fine particles 3 in Example 1 was reduced. Since the transparent film and the production process thereof in Example 3 are the same as those in Example 1 except for this change, the same points are not described here.

In the dispersion 9, the hydrophilic fine particles 3 used were silica fine particles (trade name: sicastar, model: 43-00-301) available from Corefront Corporation, and the solvent 8 used was water. The concentration of the hydrophilic fine particles 3 was 25 mg/ml, the particle size thereof was 30 nm (average), and the shape thereof was a sphere. One hydrophilic fine particle 3 was held in each gap 5a between the projections 4a, and the spaces 7a were formed up to a position corresponding to 1% of the depth of the gaps 5a between the projections 4a.

Embodiment 2

Embodiment 2 describes the case in which the structure of the base film in Embodiment 1 is changed. Since the transparent film of Embodiment 2 is the same as that of Embodiment 1 except for this change, the same points are not described here.

(1) Structure of Transparent Film

Figure 4:
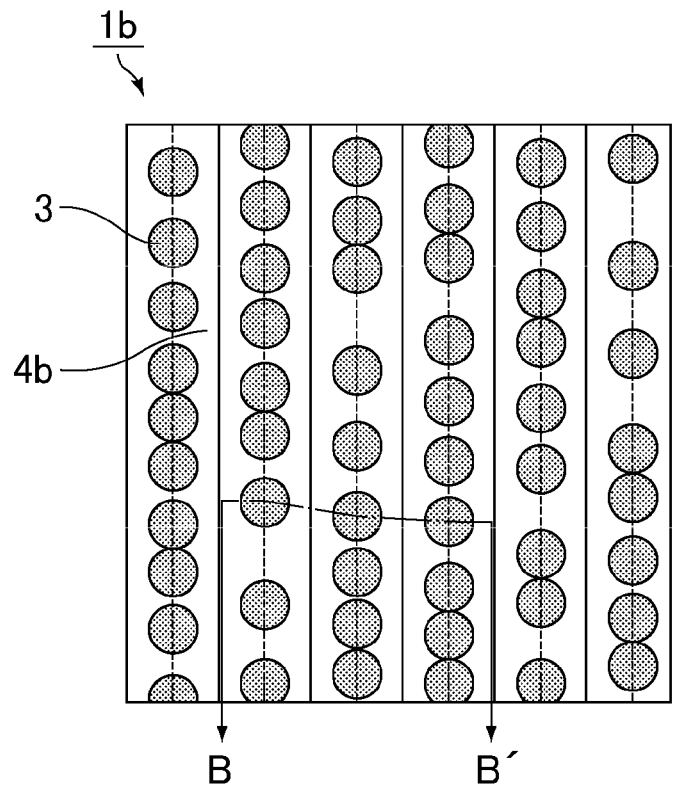
FIG. 4 is a schematic plan view of a transparent film of Embodiment 2.
Figure 5:
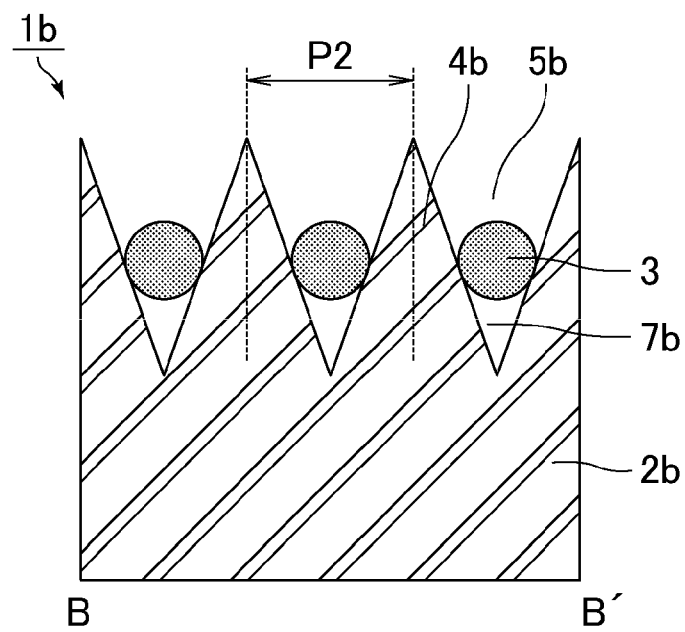
FIG. 5 is a schematic cross-sectional view of a cross section taken along the line B-B' in FIG. 4.

The structure of the transparent film of Embodiment 2 is described with reference to FIG. 4 and FIG. 5. FIG. 4 is a schematic plan view of a transparent film of Embodiment 2. FIG. 5 is a schematic cross-sectional view of a cross section taken along the line B-B' in FIG. 4. As illustrated in FIG. 4 and FIG. 5, a transparent film 1b includes a base film 2b and the hydrophilic fine particles 3. The base film 2b is a film provided on a surface with projections (protrusions) 4b formed at a pitch (distance between the tops of the adjacent projections 4b) P2 equal to or shorter than the wavelength of visible light. The gaps 5b between the projections 4b are aligned in parallel with each other in one direction. The hydrophilic fine particles 3 each have a particle size in the range of 15% to 50% of the pitch P2 of the projections 4b, and are held in the gaps 5b between the projections 4b while being in contact with the adjacent projections 4b at two sites and separated by spaces 7b from the bottoms of the gaps 5b between the projections 4b. That is, the hydrophilic fine particles 3 are in contact with both of the adjacent projections 4b, and the total number of the contact sites is two. The spaces 7b are arranged to form channels in parallel with each other in one direction on the surface of the transparent film 1b. The solid lines in the top-down direction of FIG. 4 indicate the tops of the projections 4b, and the dashed lines in the top-down direction indicate the outlines of the bottoms of the projections 4b. FIG. 4 and FIG. 5 each clearly illustrate the projection/recess structure and the hydrophilic fine particles 3 in an enlarged view. In the actual transparent film 1b, the projections 4b and the hydrophilic fine particles 3 are significantly small (smaller than the wavelength of visible light) relative to the area of the transparent film 1b. The projection/recess structure and the hydrophilic fine particles 3 therefore cannot be identified as illustrated in FIG. 4 and FIG. 5 by the naked eye or with an optical device such as an optical microscope.

The projections 4b may each have any shape. For efficient placement of the hydrophilic fine particles 3, the projections 4b each preferably have a shape that tapers toward the end (tapered shape). In this case, the shape of the gaps 5b between the projections 4b may be an inverted triangle as illustrated in FIG. 5 or an inverted trapezoid, for example.

The pitch P2 of the projections 4b may be any pitch equal to or shorter than the wavelength (780 nm) of visible light. For sufficient prevention of optical phenomena such as a moiré pattern and iridescent unevenness, the pitch P2 is preferably in the range of 100 nm to 400 nm, more preferably in the range of 100 nm to 200 nm. The pitch P2 of the projections 4b as used herein refers to the average of the distances between all the adjacent projections within a 1-μm square region on a SEM photograph (plan picture) taken with the SEM (trade name: S-4700) available from Hitachi, Ltd. as a measurement device.

The height of the projections 4b may be any height that is designed to retain the hydrophilic fine particles 3 within the gaps 5b between the projections 4b, and is preferably 50 nm or higher. Furthermore, for simultaneous achievement of the later-described suitable aspect ratio of the projections 4b, the height of the projections 4b is preferably in the range of 50 nm to 600 nm, more preferably in the range of 100 nm to 300 nm. The height of the projections 4b as used herein refers to the average of the heights of 10 projections formed in a continuous row on a SEM photograph (cross-sectional picture) taken with the SEM (trade name: S-4700) available from Hitachi, Ltd. as a measurement device. Here, projections with a defect or deformation (e.g., portions deformed in preparation of a sample for SEM photographs) are excluded from the 10 projections. Samples for SEM photographs are taken in a region without specific defects of base films. For example, in the case of a continuously produced rolled base film, a sample is taken in the vicinity of the center of the film.

The aspect ratio of the projections 4b is not particularly limited, but is preferably 1.5 or smaller in terms of the processability of the projection/recess structure. If the aspect ratio of the projections 4b is too large (the projections 4b are elongated), the projections may stick to each other (sticking) or deteriorate the transfer condition for formation of the projection/recess structure (e.g., the projections may clog the mold for the projection/recess structure or cause winding of the mold). For sufficient prevention of optical phenomena such as a moiré pattern and iridescent unevenness, the aspect ratio of the projections 4b is preferably in the range of 0.8 to 1.5. The aspect ratio of the projections 4b as used herein refers to a ratio (height/pitch P2) of the height of the projections 4b to the pitch P2 of the projections 4b which have been determined as described above with the SEM (trade name: S-4700) available from Hitachi, Ltd. as a measurement device.

In order to form the projections 4b as described above, the material of the projections 4b is preferably resin. For sufficient increase in the hydrophilicity of the transparent film, the projections 4b each preferably have a hydrophilic surface. If the projections 4b each have a hydrophobic surface, the transparent film may not allow water droplets generated by condensation to spread easily, and may fail to achieve a sufficient anti-fog property. A dispersion containing the hydrophilic fine particles 3 dispersed therein is to be applied to the base film 2b in production of the transparent film of Embodiment 2, and the solvent for the dispersion is typically a polar solvent such as water, ethanol, an alcohol-based solvent, or an ester-based solvent. For this reason, in order to also cause the dispersion to spread efficiently to the entire base film 2b, the projections 4b each preferably have a hydrophilic surface. If the projections 4b each have a hydrophobic surface, the dispersion may not be well applied to the gaps 5b between the projections 4b. The surfaces of the projections 4b can be made hydrophilic by, for example, a method of introducing hydrophilic functional groups to the resin material in the monomeric state of the projections 4b, a method of curing a resin material and modifying the cured surface with electron beam irradiation or plasma irradiation to form —OH groups or —COOH groups on the surface, or a method of introducing ion-exchange groups (e.g., —COOH groups) to the surfaces of the projections 4b. With ion-exchange groups introduced to the surfaces of the projections 4b, the ions are fixed on the surfaces of the projections 4b, so that the durability of the projections 4b can be increased. Furthermore, even in the case that water droplets are generated by condensation on the surfaces of the projections 4b, the ionic functional groups on the surfaces of the projections 4b lose touch with the surfaces to become ions, causing freezing-point depression to decrease the temperature at which frost forms. Thereby, in the case of applying the transparent film of Embodiment 2 to the window of a showcase freezer, for example, the lower end of the operating temperature limit can be further decreased.

For efficient utilization of the capillary action and sufficient increase in the anti-fog property, the spaces 7b are preferably formed up to a position corresponding to 20% or lower of the depth of the gaps 5b between the projections 4b, more preferably up to a position corresponding to 0.5% to 10% of the depth of the gaps 5b between the projections 4b.

The base film 2b in the transparent film of Embodiment 2 has a structure in which the gaps 5b between the projections 4b are arranged in parallel with each other in one direction as illustrated in FIG. 4 and FIG. 5. Still, the base film 2b may have any structure in which the gaps 5b between the projections 4b form channels to allow water to spread by the capillary action. For example, the base film 2b may have a structure in which the gaps 5b between the projections 4b are formed at least in one direction, such as a structure in which the gaps 5b between the projections 4b are formed in a grid pattern, or a structure in which the gaps 5b are formed in a honeycomb pattern.

It is clear that the transparent film of Embodiment 2 can achieve the same effects as that of Embodiment 1.

(2) Process of Producing Transparent Film

Figure 6:
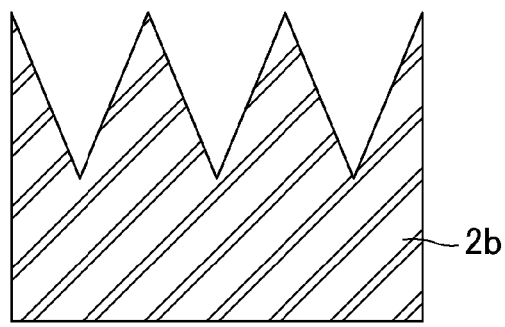
FIG. 6 includes schematic cross-sectional views for describing the process of producing the transparent film of Embodiment 2 (steps a to d).
Figure 6:
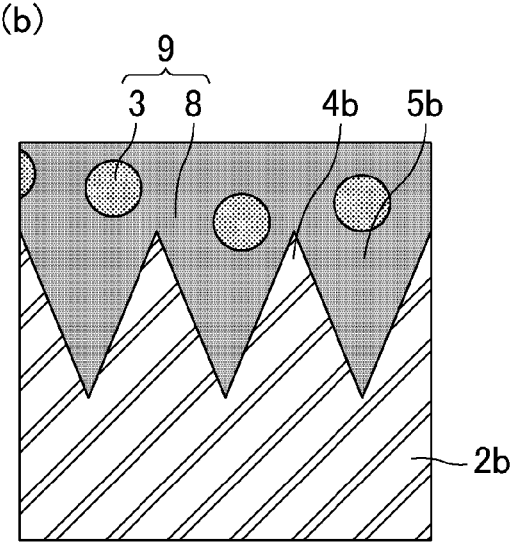
Figure 6:
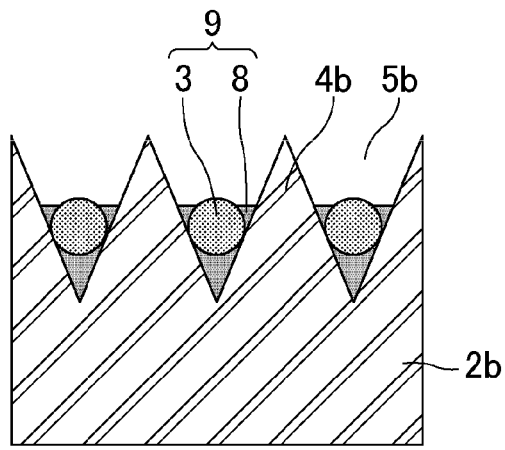
Figure 6:
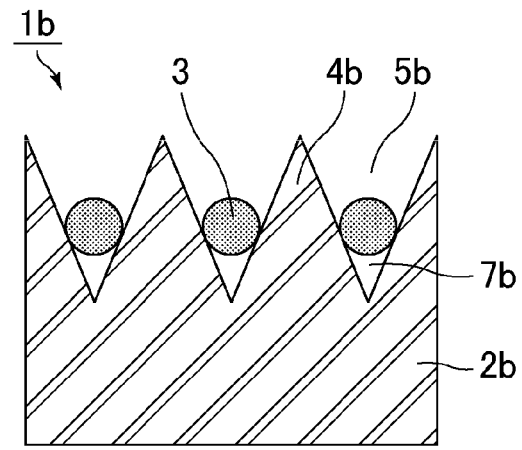

The process of producing the transparent film of Embodiment 2 is exemplified with reference to FIG. 6. FIG. 6 includes schematic cross-sectional views for describing the process of producing the transparent film of Embodiment 2 (steps a to d).

(a) Production of Base Film

First, a mold is prepared in which projections and recesses are aligned in parallel with each other in one direction and the cross-sectional shape of each recess is an inverted triangle. This mold pattern is transferred to a photo-curable resin by optical nanoimprinting, whereby the base film 2b illustrated in FIG. 6(a) is produced.

(b) Application of Dispersion

As illustrated in FIG. 6(b), the dispersion 9 in which the hydrophilic fine particles 3 are dispersed in the solvent 8 is applied to the base film 2b.

(c) Drying

As illustrated in FIG. 6(c), the applied dispersion 9 is dried to evaporate the solvent 8. FIG. 6(c) illustrates the state where, in the course of evaporation of the solvent 8, the hydrophilic fine particles 3 are separately placed in the respective gaps 5b between the projections 4b and aligned.

(d) Completion of Transparent Film

After the above process (c), as illustrated in FIG. 6(d), the solvent 8 is completely evaporated to leave the hydrophilic fine particles 3 to adhere to the respective gaps 5b between the projections 4b, whereby a transparent film 1b is completed. In the transparent film 1b, the hydrophilic fine particles 3 are held in the respective gaps 5b between the projections 4b while being in contact with the adjacent projections 4b at two sites and separated by the spaces 7b from the bottoms of the respective gaps 5b between the projections 4b.

Hereinafter, an example is described in which the transparent film of Embodiment 2 was actually produced.

Example 4

Example 4 describes the case in which the structure of the base film in Example 2 was changed. Since the transparent film and the production process thereof in Example 4 are the same as those in Example 2 except for this change, the same points are not described here.

The mold used for production of the base film 2b was a mold (V-thread type) available from NTT Advanced Technology Corporation. The mold had the following specifications.

Cross-sectional shape of recesses: inverted triangle
Pitch of projections: 200 nm
Height of projections (depth of recesses): 100 nm The base film 2*b* had the following specifications
Cross-sectional shape of gaps 5*b* between projections 4*b*: inverted triangle
Pitch P2 of projections 4*b*: 200 nm
Height of projections 4*b* (depth of gaps 5*b* between projections 4*b*): 200 nm
Aspect ratio of projections 4*b*: 1
Contact angle of water on projections 4*b*: 10°
Total thickness of base film 2*b* (including height of projections 4*b*): 90 μm The hydrophilic fine particles 3 were held in the respective gaps 5*b* between the projections 4*b*, and the spaces 7*b* were formed up to a position corresponding to 5% of the depth of the gaps 5*b* between the projections 4*b*.

Embodiment 3

Embodiment 3 describes the case in which the hydrophilic fine particles in Embodiment 1 are surface-modified with ion-exchange groups. Since the transparent film of Embodiment 3 is the same as that of Embodiment 1 except for this change, the same points are not described here.
(1) Structure of Transparent Film The structure of the transparent film of Embodiment 3 is the same as that in Embodiment 1, except that the hydrophilic fine particles 3 illustrated in FIG. 1 and FIG. 2 are surface-modified with ion-exchange groups. The ion-exchange groups usable are, for example, —COOH, —(NH$_3$)$^+$, —SO$_3$$^-$ groups.

It is clear that the transparent film of Embodiment 3 can achieve the same effects as that of Embodiment 1. In the transparent film of Embodiment 3, since the hydrophilic fine particles 3 are surface-modified with ion-exchange groups, the hydrophilic fine particles 3 exhibit an increased surface tension in a measurement with water. Accordingly, when condensation occurs on the surfaces of the hydrophilic fine particles 3, the hydrophilic fine particles 3 can allow water to spread efficiently by the capillary action of the spaces 7*a* before water turns into water droplets. Furthermore, even in the case that water droplets are generated by condensation on the surfaces of the hydrophilic fine particles 3, the ionic functional groups on the surfaces of the hydrophilic fine particles 3 lose touch with the surfaces to become ions, causing freezing-point depression to decrease the temperature at which frost forms. Thereby, in the case of applying the transparent film of Embodiment 3 to the window of a showcase freezer, for example, the lower end of the operating temperature limit can be further decreased.
(2) Process of Producing Transparent Film The process of producing the transparent film of Embodiment 3 is the same as that in Embodiment 1, except that the hydrophilic fine particles 3 illustrated in FIG. 3 are ones surface-modified with ion-exchange groups.

Hereinafter, an example is described in which the transparent film of Embodiment 3 was actually produced.

Example 5

Example 5 describes the case in which the hydrophilic fine particles 3 in Example 1 were surface-modified with ion-exchange groups. Since the transparent film and the production process in Example 5 are the same as those in Example 1 except for this change, the same points are not described here.

In the dispersion 9, the hydrophilic fine particles used were polymer latex fine particles (trade name: Micromer®, model: 01-02-501) available from Corefront Corporation, and the solvent 8 used was water. These polymer latex fine particles are silica fine particles surface-modified with —COOH groups (ion-exchange groups). The concentration of the hydrophilic fine particles 3 was 10 mg/ml, the particle size thereof was 50 nm (average), and the shape thereof was a sphere. One hydrophilic fine particle 3 was held in each gap 5*a* between the projections 4*a*, and the spaces 7*a* were formed up to a position corresponding to 4% of the depth of the gaps 5*a* between the projections 4*a*.
[Evaluation Result 1]

The results of evaluating the anti-fog property, condensation property, and solvent-wiping property of the transparent films of Examples 1 to 5 are shown in Table 1. The same evaluation was performed as Comparative Example 1 on the base film 2*a* (anti-reflection film having a moth-eye structure) used in Example 1. The same evaluation was also performed as Comparative Example 2 on a configuration in which the particle size of the hydrophilic fine particles 3 in Example 1 was increased. In the dispersion used for production of the transparent film of Comparative Example 2, the hydrophilic fine particles used were silica fine particles (trade name: sicastar, model: 43-00-202) available from Corefront Corporation, and the solvent used was water. The concentration of the hydrophilic fine particles was 50 mg/ml, the particle size thereof was 200 nm (average), and the shape thereof was a sphere. Also, the transparent film of Comparative Example 2 was observed with a SEM (trade name: S-4700) available from Hitachi, Ltd. The observation revealed that part of each hydrophilic fine particle fitted in a gap between projections, but the half or more of the volume of the particle was out of the gap between the projections. Moreover, the same evaluation was performed as Comparative Example 3 on a configuration in which the particle size of the hydrophilic fine particles 3 in Example 1 was decreased. In the dispersion used for production of the transparent film of Comparative Example 3, the hydrophilic fine particles used were silica fine particles (trade name: sicastar, model: 43-00-101) available from Corefront Corporation, and the solvent used was water. The concentration of the hydrophilic fine particles was 25 mg/ml, the particle size thereof was 10 nm (average), and the shape thereof was a sphere.

The anti-fog property was evaluated by measuring the rate at which a water droplet dropped onto the sample of each example spread. Specifically, a 80-μl droplet of pure water was formed with a microsyringe (trade name: Ito microsyringe MS-250) available from Ito Corporation. The droplet was brought into contact with the sample of each example, and the time (unit: second) for the droplet to move 10 mm on the surface of the sample was recorded. This time was used as an index of evaluation of the anti-fog property.

The condensation property was evaluated by measuring the temperature (melting temperature) at which the frost on the sample of each example taken out of a freezer turned into water droplets. Specifically, first, the sample of each example was attached to a 0.8-mm-thick glass substrate, and the product was left in a freezer set to −20° C. for 30 minutes. The product was then taken out to the environment with a temperature of 25° C. and a humidity of 50%. The change in the surface temperature of each sample was measured to record the temperature at which the melting started. The freezer used was a thermostatic bath (trade name: ECONAS series CH43-12) available from Nagano Science Co., Ltd. The surface temperature was measured with a radiation thermometer (trade name: DT-8855) available from Sato Shoji Inc.

The solvent-wiping property was evaluated by determining whether or not stain adhering to each sample was wiped off with a solvent. Specifically, the sample of each example was wiped three times with a non-woven fabric (trade name: BEMCOT®) available from Asahi Kasei Fibers Corp. which was folded in four and impregnated with water. Whether or not the stain was wiped off was determined.

TABLE 1

| | Anti-fog property (sec) | Condensation property (° C.) | Solvent-wiping property |
|---|---|---|---|
| Example 1 | 5 | 2 | Wiped |
| Example 2 | 3 | 2 | Wiped |
| Example 3 | 6 | 2 | Wiped |
| Example 4 | 5 | 2 | Wiped |
| Example 5 | 3 | 0 | Wiped |
| Comparative Example 1 | 25 | 2 | Wiped |
| Comparative Example 2 | 23 | 2 | Wiped |
| Comparative Example 3 | 18 | 2 | Wiped |

As shown in Table 1, all the samples of Examples 1 to 5 had a better anti-fog property than those of Comparative Examples 1 to 3. In particular, the samples of Examples 2 and 5 allowed a water droplet to spread at a higher rate than those of Examples 1, 3, and 4, and therefore had a better anti-fog property. In contrast, the samples of Comparative Examples 2 and 3 had a worse anti-fog property than that of Example 1 even though the samples had a configuration in which the same base film and hydrophilic fine particles as those in Example 1 were combined. In Comparative Example 2, since the particle size (200 nm) of the hydrophilic fine particles was the same as the pitch (200 nm) of the projections on the base film, the size of the spaces between the hydrophilic fine particles and the bottoms of the gaps between the projections was as large as the size of the gaps between the projections, so that the capillary action could not be utilized sufficiently as in the case of Comparative Example 1. In Comparative Example 3, since the particle size of the hydrophilic fine particles was too small, the size of the spaces between the hydrophilic fine particles and the bottoms of the gaps between the projections was small. The resulting channels were therefore extremely narrow, and the capillary action thereof was insufficient.

As shown in Table 1, all the samples of Examples 1 to 5 exhibited the same or higher condensation property than those of Comparative Examples 1 to 3. In particular, the sample of Example 5 had a lower melting temperature and thus a better condensation property than those of Examples 1 to 4. This is because in the transparent film of Example 5, the hydrophilic fine particles were surface-modified with ion-exchange groups.

As shown in Table 1, the stain could be wiped off with a solvent from all the samples of Examples 1 to 5. Here, in Examples 1 to 5, the hydrophilic fine particles were not wiped off. In contrast, in the sample of Comparative Example 2, most of the hydrophilic fine particles were wiped off. Also, in the sample of Comparative Example 3, an increase in the number of times of wiping (specifically, the fourth cycle and later when one cycle consists of three times of wiping) caused some of the hydrophilic fine particles to be wiped off. This is because in the transparent film of Comparative Example 3, since some of the hydrophilic fine particles, which had a small particle size, were not in contact with the projections, those loosely fixed in the gaps between the projections were wiped off.

[Evaluation Result 2]

The transparent film of Example 1 and a commercially available anti-fog film were compared. The commercially available anti-fog film used was an anti-fog film (trade name: prosper) available from Murayama Shoji K.K.

Comparative Example 4

(Evaluation of Anti-Fog Property)

Table 2 shows the results of evaluating the wiping dependency of the anti-fog property of the samples of Example 1 and Comparative Example 4. Specifically, first, the sample of each example was wiped once with a non-woven fabric (trade name: BEMCOT) available from Asahi Kasei Fibers Corp. which was folded in four and impregnated with water. This process was repeated three times, which was counted as one cycle. For prevention of re-adhesion of the stain, a new BEMCOT was used for each wiping performance (every time). The sample of each example after one cycle was left under the conditions with a temperature of 25° C. and a humidity of 50% for 10 minutes. Thereafter, a 80-μl droplet of pure water was formed with a microsyringe (trade name: Ito microsyringe MS-250) available from Ito Corporation. The droplet was brought into contact with the sample of each example, and the time (unit: second) for the droplet to move 10 mm on the surface of the sample was recorded. This time was used as an index of evaluation of the anti-fog property. Thereafter, the time for a droplet to move 10 mm on each sample was recorded every time after the second to fifth cycles. In Table 2, the number of times of wiping of 0 cycles means the initial state where no wiping was performed.

TABLE 2

| Number of times of wiping (cycles) | Anti-fog property in Example 1 (sec) | Anti-fog property in Comparative Example 4 (sec) |
|---|---|---|
| 0 | 5 | 6 |
| 1 | 7 | 8 |
| 2 | 6 | 25 |
| 3 | 6 | 120 |
| 4 | 7 | Droplet did not spread |
| 5 | 6 | Droplet did not spread |

As shown in Table 2, the sample of Example 1 exhibited a better anti-fog property than that of Comparative Example 4 after the zeroth and first cycles (the number of times of wiping), but no great difference was found therebetween. However, after the second cycle, the difference between the samples became larger. The sample of Example 1 had a much better anti-fog property than that of Comparative Example 4.

The anti-fog property of the sample of Example 1 was almost constant regardless of the number of times of wiping. One of the factors contributing to the constant anti-fog property is the intermolecular forces between the hydrophilic fine particles and the projections which prevented the hydrophilic fine particles from being wiped off. Another factor contributing to the constant anti-fog property is the hydrophilic functional groups present on the surfaces of the hydrophilic fine particles which were chemically bonded to the resin (polymer) constituting the projections and prevented the hydrophilic fine particles from being wiped off.

In contrast, in Comparative Example 4, the anti-fog property decreased as the number of times of wiping increased, and the water droplet did not spread after the fourth cycle and later. The anti-fog film used in Comparative Example 4 contains an anti-fog material kneaded into the resin constituting the base material, and exhibits the anti-fog property with part of the anti-fog material emerging to the surface. Such an anti-fog film unfortunately exhibits a decreased anti-fog property when the anti-fog material on the surface decreases. For this reason, in the anti-fog film of Comparative Example 4, the anti-fog material on the surface was presumably wiped off by wiping with water, which resulted in a decrease in the anti-fog property.

(Evaluation of Wiping Property with Organic Solvent)

The wiping property of the samples of Example 1 and Comparative Example 4 was evaluated with an organic solvent. Specifically, the sample of each example was wiped three times with a non-woven fabric (trade name: BENCOT) available from Asahi Kasei Fibers Corp. which was folded in four and impregnated with water, and whether or not the stain was wiped of was determined.

The sample of each example was observed. In the sample of Example 1, the stain was wiped off with an organic solvent. In contrast, in the sample of Comparative Example 4, the anti-fog material was wiped off, and the function (anti-fog property) of the anti-fog film was deteriorated. In the sample of Example 1, the hydrophilic functional groups present on the surfaces of the hydrophilic fine particles were chemically bonded to the resin (polymer) constituting the projections and were therefore prevented from being wiped off with the organic solvent, so that the anti-fog property did not deteriorate.

[Additional Remarks]

Hereinafter, examples of preferred features of the first transparent film of the present invention are described. The examples may appropriately be combined within the spirit of the present invention.

The hydrophilic fine particles may be in contact with the adjacent projections at least at two sites. Thereby, with the intermolecular forces between the hydrophilic fine particles and the adjacent projections, the hydrophilic fine particles can be sufficiently strongly fixed in the gaps between the projections. Also, since a component such as a binder is not used, the hydrophilic fine particles can be effectively utilized without hindrance to the hydrophilic function.

The number of the hydrophilic fine particles being in contact with the adjacent projections at least at two sites as a percentage of all the hydrophilic fine particles may be in the range of 30% to 100%. In this case, the hydrophilic fine particles can be sufficiently prevented from being wiped off, so that the anti-fog property can be sufficiently prevented from deteriorating.

The hydrophilic fine particles may be silica fine particles. In this case, the hydrophilicity of the first transparent film of the present invention is sufficiently increased. As a result, the anti-fog property can be sufficiently increased.

The hydrophilic fine particles may be surface-modified with ion-exchange groups. In this case, the hydrophilic fine particles exhibit an increased surface tension in a measurement with water. Accordingly, when condensation occurs on the surfaces of the hydrophilic fine particles, the hydrophilic fine particles can allow water to spread efficiently by the capillary action of the spaces before water turns into water droplets. Furthermore, even in the case that water droplets are generated by condensation on the surfaces of the hydrophilic fine particles, the ionic functional groups on the surfaces of the hydrophilic fine particles lose touch with the surfaces to become ions, causing freezing-point depression to decrease the temperature at which frost forms. Thereby, in the case of applying the first transparent film of the present invention to the window of a showcase freezer, for example, the lower end of the operating temperature limit can be further decreased.

The projections may each have a hydrophilic surface. In this case, the hydrophilicity of the first transparent film of the present invention can be sufficiently increased by combination use of the projections with the hydrophilic fine particles, and thereby the anti-fog property can be sufficiently increased.

The hydrophilic fine particles may exhibit a surface tension equal to or higher than the surface tension of the projections in a measurement with water. In this case, the contact angle of water on the hydrophilic fine particles decreases, which further increases the hydrophilicity of the hydrophilic fine particles. As a result, the anti-fog property of the first transparent film of the present invention can be sufficiently increased.

The pitch of the projections may be in the range of 100 nm to 400 nm. In this case, optical phenomena such as a moiré pattern and iridescent unevenness can be sufficiently prevented.

The projections may have an aspect ratio in the range of 0.8 to 1.5. In this case, optical phenomena such as a moiré pattern and iridescent unevenness can be sufficiently prevented, so that favorable reflectance characteristics can be achieved.

<Second Transparent Film of the Present Invention>

Hereinafter, the second transparent film of the present invention is described in more detail based on Embodiments 4 and 5 (Examples 6 to 8) with reference to the drawings. The embodiments (examples), however, are not intended to limit the scope of the second transparent film of the present invention. The configurations of the embodiments (examples) may appropriately be combined or modified within the spirit of the present invention.

Embodiment 4

A transparent film of Embodiment 4 includes a base film and an ionic liquid.

(1) Structure of Transparent Film

Figure 7:
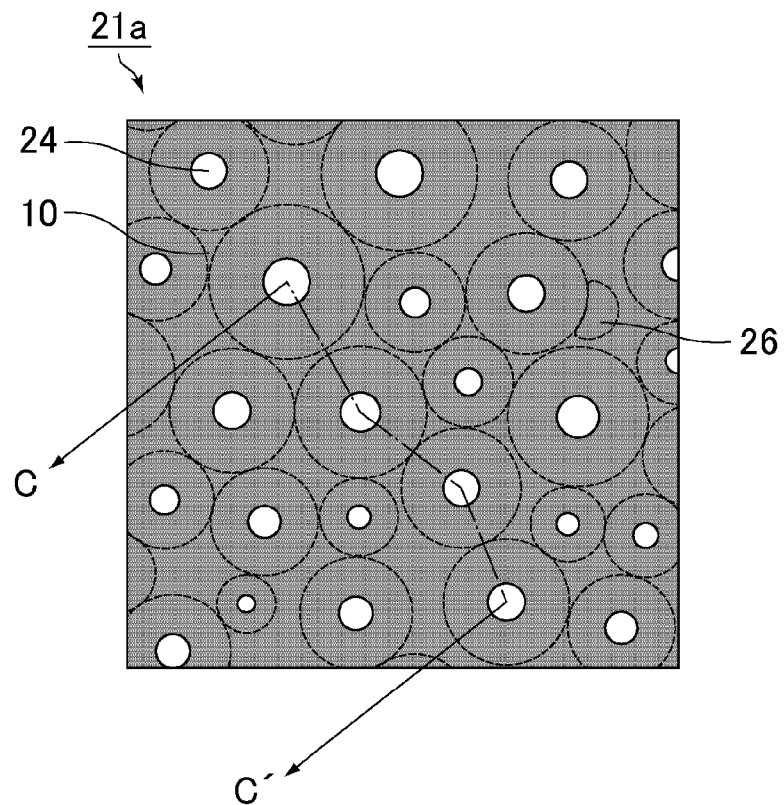
FIG. 7 is a schematic plan view of a transparent film of Embodiment 4.
Figure 8:
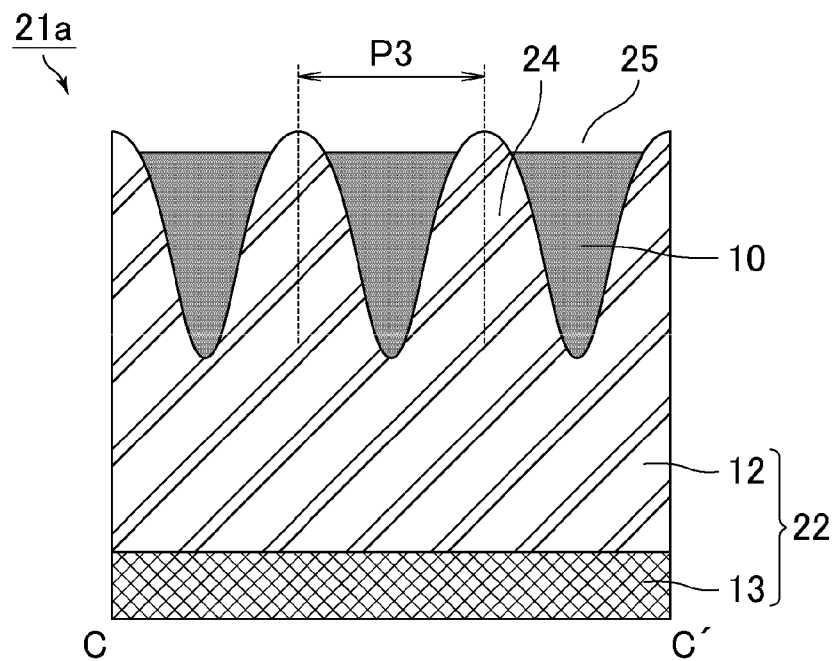
FIG. 8 is a schematic cross-sectional view of a cross section taken along the line C-C' in FIG. 7.

The structure of the transparent film of Embodiment 4 is described with reference to FIG. 7 and FIG. 8. FIG. 7 is a schematic plan view of a transparent film of Embodiment 4. FIG. 8 is a schematic cross-sectional view of a cross section taken along the line C-C' in FIG. 7. As illustrated in FIG. 7 and FIG. 8, a transparent film 21a includes a base film 22 and an ionic liquid 10. The base film 22 corresponds to an anti-reflection film provided on a surface with projections (protrusions) 24 formed at a pitch (distance between the tops of the adjacent projections 24) P3 equal to or shorter than the wavelength of visible light, i.e., an anti-reflection film having a moth-eye structure. The transparent film 21a therefore can exhibit a low-reflection property with the moth-eye structure. The base film 22 has a configuration in which a resin layer 12 is formed on (attached to) a triacetyl cellulose (TAC) film 13, and the resin layer 12 is provided on a surface with the projections 24. Gaps 25 between the projections 24 are arranged in a mesh pattern to form channels on the surface of the base film 22. The expression that the gaps 25 between the projections 24 form channels as used herein means that the gaps 25 between the projections 24 form channels to exert the capillary action such that the ionic liquid 10 can spread. Here, the gaps 25 between the projections 24 are preferably arranged such that the heights of the ionic liquid 10 surfaces can be uniform on the surface of the base film 22. The gaps 25 between the projections 24 are preferably continuous from one end of the base film 22 to the other end, and are preferably arranged in a mesh pattern. The ionic liquid 10 is hydrophilic, and is placed in the gaps 25 between the projections 24. The dashed lines in FIG. 7 indicate the outlines of the bottoms of the projections 24. FIG. 7 and FIG. 8 each clearly illustrate the moth-eye structure and the ionic liquid 10 placed in a mesh pattern in an enlarged view. In the actual transparent film 21a, the projections 24 and the gaps 25 between the projections 24 are significantly small (smaller than the wavelength of visible light) relative to the area of the transparent film 21a. The moth-eye structure and the ionic liquid 10 placed in a mesh pattern therefore cannot be identified as illustrated in FIG. 7 and FIG. 8 by the naked eye or with an optical device such as an optical microscope.

The projections 24 may each have any shape that tapers toward the end (tapered shape). Examples of the shape include shapes formed by a pillar-shaped bottom portion and a hemispherical top portion (hereinafter, also referred to as bell shapes) and conical shapes (cone shapes, circular cone shapes). Also, the projections 24 may have a shape with branched projections. The branched projections refer to projections formed at an irregular pitch in the anodizing and etching for formation of a moth-eye structure, such as the projections (branched projections 26) as illustrated in FIG. 7. In the case that the ends of the projections 24 protrude from the surface of the ionic liquid 10 as illustrated in FIG. 8, the projections 24 each preferably have a bell shape with gradually curved ends as illustrated in FIG. 8, for efficient provision of the paths in which stain is wiped off (to minimize the chances for the ends of the projections 24 to be obstacles). Although the bottoms of the gaps 25 between the projections 24 each are curved in FIG. 8, the bottoms may each form a horizontal line without curvature.

The pitch P3 of the projections 24 may be any pitch equal to or shorter than the wavelength (780 nm) of visible light. For sufficient prevention of optical phenomena such as a moiré pattern and iridescent unevenness, the pitch P3 is preferably in the range of 100 nm to 400 nm, more preferably in the range of 100 nm to 200 nm. The pitch P3 of the projections 24 as used herein refers to the average of the distances between all the adjacent projections, excluding the branched projections, within a 1-μm square region on a scanning electron microscope (SEM) photograph (plan picture) taken with a SEM (trade name: S-4700) available from Hitachi, Ltd. as a measurement device.

The height of the projections 24 may be any height, but is preferably 50 cm or higher for efficient placement of the ionic liquid 10. Furthermore, for simultaneous achievement of the later-described suitable aspect ratio of the projections 24, the height of the projections 24 is preferably in the range of 50 nm to 600 nm, more preferably in the range of 100 cm to 300 nm. The height of the projections 24 as used herein refers to the average of the heights of 10 projections formed in a continuous row, excluding the branched projections, on a SEM photograph (cross-sectional picture) taken with the SEM (trade name: S-4700) available from Hitachi, Ltd. as a measurement device. Here, projections with a defect or deformation (e.g., portions deformed in preparation of a sample for SEM photographs) are excluded from the 10 projections. Samples for SEM photographs are taken in a region without specific defects of anti-reflection films. For example, in the case of a continuously produced rolled anti-reflection film, a sample is taken in the vicinity of the center of the film.

The aspect ratio of the projections 24 is not particularly limited, but is preferably 1.5 or smaller in terms of the processability of the moth-eye structure. If the aspect ratio of the projections 24 is too large (the projections 24 are elongated), the projections may stick to each other (sticking) or deteriorate the transfer condition for formation of the moth-eye structure (e.g., the projections may clog the female mold for the moth-eye structure or cause winding of the female mold). In the case that the ends of the projections 24 protrude from the surface of the ionic liquid 10 as illustrated in FIG. 8, for achievement of favorable reflectance characteristics with the protruded portions of the projections 24, the aspect ratio of the projections 24 is preferably in the range of 0.8 to 1.5. Thereby, optical phenomena such as a moiré pattern and iridescent unevenness can be sufficiently prevented. The aspect ratio of the projections 24 as used herein refers to a ratio (height/pitch P3) of the height of the projections 24 to the pitch P3 of the projections 24 which have been determined as described above with the SEM (trade name: S-4700) available from Hitachi, Ltd. as a measurement device.

The projections 24 may be arranged in any pattern, and may be arranged randomly or regularly. For sufficient prevention of occurrence of a moiré pattern, the projections 24 are preferably arranged randomly as illustrated in FIG. 7.

In order to form the projections 24 as described above, the material of the projections 24 is preferably resin. For sufficient increase in the hydrophilicity of the transparent film, the projections 24 each preferably have a hydrophilic surface. If the projections 24 each have a hydrophobic surface, the transparent film may not allow water droplets generated by condensation to spread easily, and may fail to achieve a sufficient anti-fog property. A solution containing the ionic liquid 10 is to be applied to the base film 22 in production of the transparent film of Embodiment 4, and the solvent for the solution is typically water (pure water). For this reason, in order to also cause the solution to spread efficiently to the entire base film 22, the projections 24 each preferably have a hydrophilic surface. If the projections 24 each have a hydrophobic surface, the dispersion may not be well applied to the gaps 25 between the projections 24 due to the hydrophobicity as well as the lotus effect of the moth-eye structure. The surfaces of the projections 24 can be made hydrophilic by, for example, a method of introducing hydrophilic functional groups to the resin material in the monomeric state of the projections 24, a method of curing a resin material and modifying the cured surface with electron beam irradiation or plasma irradiation to form —OH groups or —COOH groups on the surface, or a method of introducing ion-exchange groups (e.g., —COOH groups) to the surfaces of the projections 24. With ion-exchange groups introduced to the surfaces of the projections 24, the ions are fixed on the surfaces of the projections 24, so that the durability of the projections 24 can be increased. Furthermore, even in the case that water droplets are generated by condensation on the surfaces of the projections 24, the ionic functional groups on the surfaces of the projections 24 lose touch with the surfaces to become ions, causing freezing-point depression to decrease the temperature at which frost forms. That is, frost forms once on the surfaces of the projections 24 as the workpiece is cooled, but can be controlled to disappear at a lower temperature as the temperature is increased. In the case of applying such a transparent film to the window of a showcase freezer, for example, the lower end of the operating temperature limit can be further decreased.

The ionic liquid 10 may be any hydrophilic material. Examples of the material thereof include N,N-diethyl-N- methyl-N-(2-methoxyethyl)ammonium tetrafluoroborate (melting point: 9° C.), 1-ethyl-3-methylimidazolium trifluoromethanesulfonate ([EMIM][CF$_3$SO$_3$]) (melting point: −9° C.), 1-butyl-3-methylimidazolium trifluoromethanesulfonate ([BMIM][CF$_3$SO$_3$]) (melting point: 13° C.), 1-butyl-3-methylimidazolium chloride ([BMIM][Cl]) (melting point: 41° C.), and 1-ethyl-3-methylimidazolium ethylsulfate (melting point: lower than −65° C.). These compounds are widely available from companies including Wako Pure Chemical Industries, Ltd., Kanto Chemical Co., Inc., and Sigma-Aldrich Co. LLC. The expression that the ionic liquid 10 is hydrophilic as used herein means that the ionic liquid 10 is soluble in water. The ionic liquid 10 has a vapor pressure of almost 0, and therefore is not lost even when left in the film.

For sufficient increase in the anti-fog property, the ionic liquid 10 is preferably placed up to a position corresponding to 20% to 100%, more preferably up to a position corresponding to 50% to 100%, of the depth of the gaps 25 between the projections 24. Since the ionic liquid 10 is a transparent substance, the decrease in the transparency (transmittance) of the transparent film can be kept at the minimum even when the amount of the ionic liquid 10 is increased. The range in which the ionic liquid 10 is placed herein is the average of the ratios of: L4−L3 to L4 expressed as a percentage (100×(1−L3/L4) (%)), L3 and L4 being measured at ten points with the SEM (trade name: S-4700) available from Hitachi, Ltd. as a measurement device. Here, L4−L3 is the height of the ionic liquid 10, L3 is the height of the projections 24 protruding from the surface of the ionic liquid 10, and L4 is the depth of the gaps 25 between the projections 24. The ten measurements shall be made at points without defects, stains, and deformation selected from a 2-μm square region in the vicinity of the center of the sample.

The ionic liquid 10 preferably has a melting point of 0° C. or lower, more preferably −30° C. or lower. Under low-temperature conditions, condensation may occur on the surface of the ionic liquid 10, and at even lower temperatures (for example, 0° C.), frost may form. In contrast, the ionic liquid 10 having a melting point of 0° C. or lower remains as a liquid even in the case that water droplets are generated by condensation on the surface of the ionic liquid 10. The ionic liquid 10 therefore mixes with the water droplets generated by the condensation, so that ionic functional groups on the surface of the ionic liquid 10 lose touch with the surface to become ions, causing freezing-point depression to decrease the temperature at which frost forms. Thereby, in the case of applying such a transparent film to the window of a showcase freezer, for example, the lower end of the operating temperature limit can be further decreased.

The base film 22 in the transparent film of Embodiment 4 has a structure in which the gaps 25 between the projections 24 are arranged in a mesh pattern as illustrated in FIG. 7. The base film 22 may have any other structure such as a structure in which the gaps 25 between the projections 24 are aligned in parallel with each other in one direction, a structure in which the gaps 25 are formed in a grid pattern, or a structure in which the gaps 25 are formed in a honeycomb pattern. In these cases, the gaps 25 between the projections 24 may each have a shape such as an inverted triangle or an inverted trapezoid. Also, the base film 22 has a configuration in which the resin layer 12 is formed on (attached to) the TAC film 13 as illustrated in FIG. 7, but may have any other configuration. For example, the base film 22 may have a configuration in which a hardcoat layer is disposed between the TAC film 13 and the resin layer 12 (resin layer for formation of the moth-eye structure). The TAC film 13 may be replaced by another film.

The transparent film of Embodiment 4 can provide an increased rate for water to spread because of the hydrophilic function of the ionic liquid 10 placed in the gaps 25 between the projections 24 arranged to form channels, and therefore can achieve an excellent anti-fog property. Also, with the capillary action of the gaps 25 between the projections 24, the ionic liquid 10 flows in the gaps 25 between the projections 24 after the wiping, whereby the ionic liquid 10 is uniformly distributed again (has a self-repairing property). This avoids poor appearance due to uneven wiping, giving an excellent wiping property. In addition, the transparent film can achieve the following effects (i) and (ii).

(i) Since the ionic liquid 10 is placed in the gaps 25 between the projections 24, the ionic liquid 10 tends not to be wiped off. Here, for example, in the case that the material of the projections 24 is resin (polymer), at least one of the paired ions in the ionic liquid 10 is chemically bonded to the above resin (polymer), which sufficiently prevents the ionic liquid 10 from being wiped off. Thereby, the hydrophilic function of the ionic liquid 10 can be retained.

(ii) Since the ionic liquid 10 is hydrophilic, a transparent film with excellent anti-fouling properties against hydrophobic stains can be produced.

(2) Process of Producing Transparent Film

Figure 9:
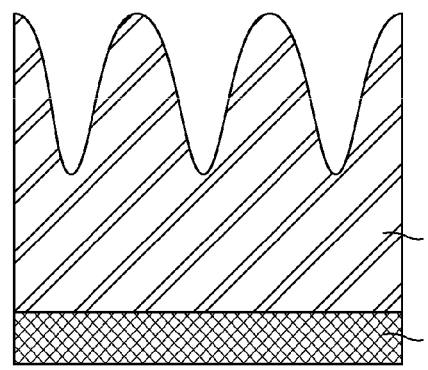
FIG. 9 includes schematic cross-sectional views for describing the process of producing the transparent film of Embodiment 4 (steps a to c).
Figure 9:
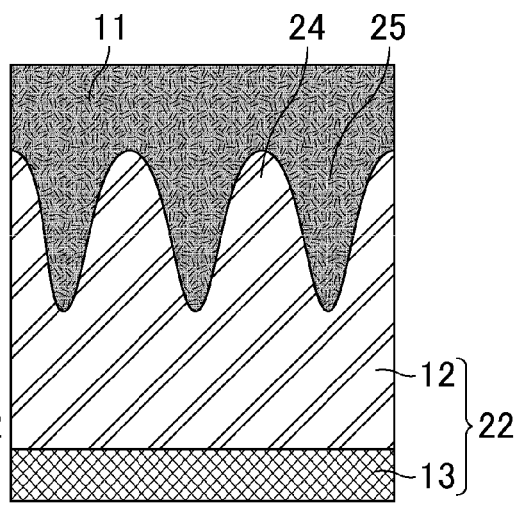
Figure 9:
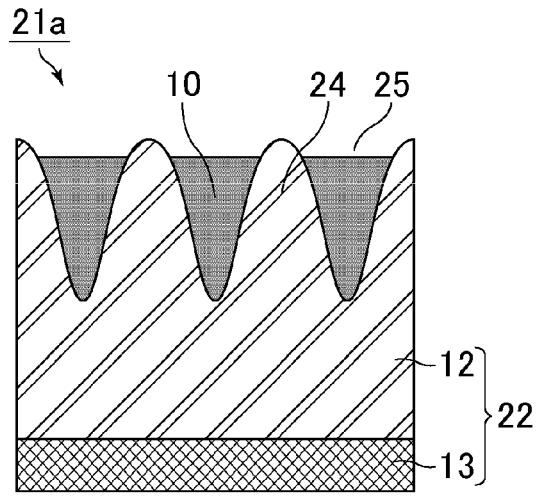

The process of producing the transparent film of Embodiment 4 is described with reference to FIG. 9. FIG. 9 includes schematic cross-sectional views for describing the process of producing the transparent film of Embodiment 4 (steps a to c).

(a) Production of Base Film

First, a substrate is produced by sequentially forming a film of silicon dioxide (SiO$_2$) (insulating layer) and a film of pure aluminum on an aluminum base material. At this time, using the aluminum base material having a roll shape, for example, enables continuous formation of the insulating layer and the pure aluminum layer. The pure aluminum layer formed on the surface of the substrate is then alternately repetitively anodized and etched, so that a female mold of the moth-eye structure is produced. Meanwhile, a film is prepared in which the resin layer 12 is attached to the TAC film 13. The female mold pattern of the moth-eye structure is transferred to the photo-curable resin (resin layer 12) by optical nanoimprinting, whereby the base film 22 as illustrated in FIG. 9(a), i.e., an anti-reflection film having a moth-eye structure, is produced.

(b) Application of Solution

As illustrated in FIG. 9(b), a solution 11 in which the ionic liquid 10 and a solvent are mixed is applied to the base film 22. The solvent in the solution 11 can be, for example, water (pure water). The concentration of the ionic liquid 10 in the solution 11 is not particularly limited, but may appropriately be determined in consideration of the amount of the ionic liquid 10 to be placed in the gaps 25 between the projections 24. The method for applying the solution 11 may be any method such as a method of applying a given amount of the solution to the base film 22 with a common coater. The application region and amount of the solution 11 can appropriately be adjusted in accordance with the specifications of the base film 22 (e.g., shape of the projections 24, the depth of the gaps 25 between the projections 24).

(c) Drying of Solution

The applied solution 11 is dried to evaporate the solvent. As a result, as illustrated in FIG. 9(c), the solvent is completely evaporated to leave the ionic liquid 10 to be placed in the gaps 25 between the projections 24, whereby a transparent film 21a is completed. The method for drying the solution 11 may be any method such as a method of performing the drying in a typical drying furnace.

Hereinafter, examples are described in which the transparent film of Embodiment 4 was actually produced.

Example 6

The process of producing a transparent film of Example 6 was as follows.
(a) Production of Base Film First, a substrate was produced by sequentially forming a film of silicon dioxide ($SiO_2$) (insulating layer) and a film of pure aluminum on an aluminum base material. The pure aluminum layer formed on the surface of the substrate was then alternately repetitively anodized and etched, so that a female mold of the moth-eye structure was produced. Meanwhile, a film was prepared in which the resin layer 12 was attached to the TAC film 13. The TAC film used was a TAC film (trade name: FUJITAC®) available from Fujifilm Corporation. The female mold pattern of the moth-eye structure was transferred to the photo-curable resin (resin layer 12) by optical nanoimprinting, whereby the base film 22 (anti-reflection film having a moth-eye structure) was produced. The base film 22 had the following specifications.

Shape of projections 24: bell shape
Pitch P3 of projections 24: 200 nm
Height of projections 24 (depth of gaps 25 between projections 24): 180 nm
Aspect ratio of projections 24: 0.9
Contact angle of water on projections 24: 10°
Thickness of resin layer 12 (including height of projections 24): 6 μm
Thickness of TAC film 13: 80 μm (b) Application of Solution The solution 11 was applied to the base film 22. In the solution 11, the ionic liquid 10 used was an ionic liquid (trade name: N,N-diethyl-N-methyl-N-(2-methoxyethyl) ammonium tetrafluoroborate, melting point: 9° C.) available from Kanto Chemical Co., Inc., and the solvent used was water (pure water). The concentration of the ionic liquid 10 in the whole amount of the solution 11 was 2.5%. The solution 11 was applied with a high-performance fully automatic applicator available from COTEC while the thickness of the applied solution 11 was adjusted to 2 μm.

(c) Drying of Solution

The applied solution 11 was dried at 120° C. for 60 minutes. The solution 11 was dried in a circulating clean oven available from Nagano Science Co., Ltd. Thereby, the transparent film of Example 6 was completed. The ionic liquid 10 was placed up to a position corresponding to 60% of the depth of the gaps 25 between the projections 24.

Example 7

Example 7 describes the case in which the ionic liquid 10 was made of a material with a lower melting point than that in Example 6. Since the transparent film and the production process thereof in Example 7 are the same as those in Example 6 except for this change, the same points are not described here.

In the solution 11, the ionic liquid 10 used was an ionic liquid (trade name: 1-ethyl-3-methylimidazolium ethylsulfate, melting point: lower than −65° C.) available from Sigma-Aldrich Co. LLC., and the solvent used was water (pure water). The concentration of the ionic liquid 10 in the whole amount of the solution 11 was 2.5%. The ionic liquid 10 was placed up to a position corresponding to 60% of the depth of the gaps 25 between the projections 24.

Embodiment 5

Figure 10:
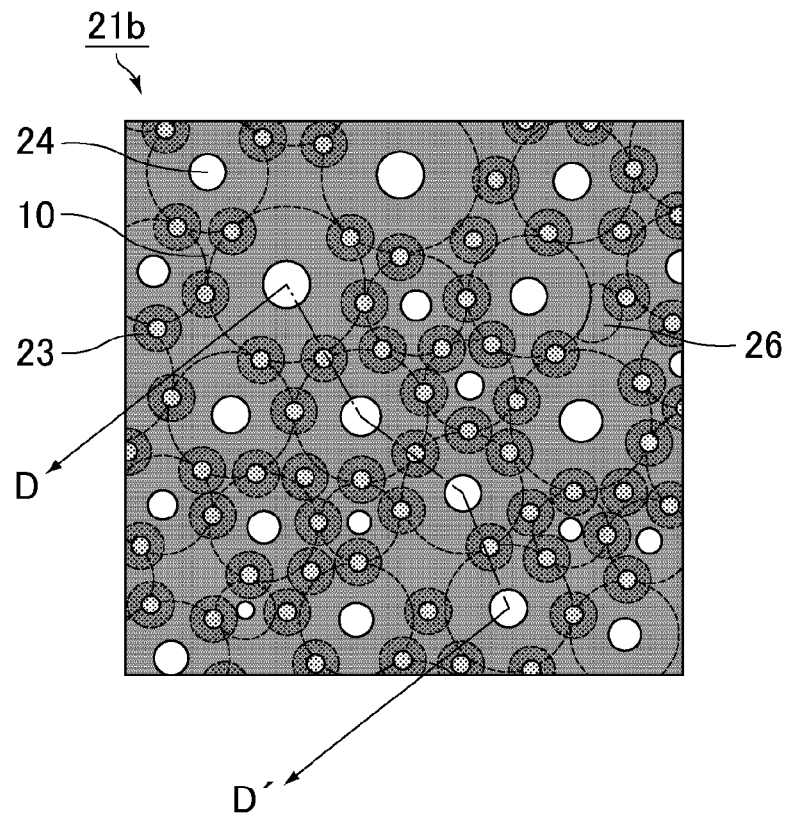
FIG. 10 is a schematic plan view of a transparent film of Embodiment 5.
Figure 11:
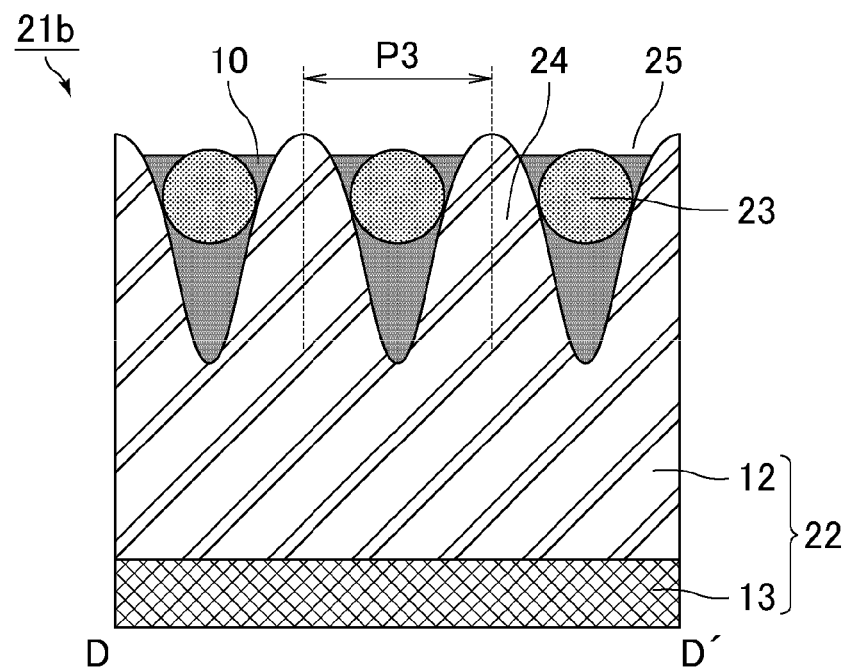
FIG. 11 is a schematic cross-sectional view of a cross section taken along the line D-D' in FIG. 10.

Embodiment 5 describes the case in which hydrophilic fine particles are placed in the gaps between the projections in Embodiment 4. Since the transparent film of Embodiment 5 is the same as that of Embodiment 4 except for this change, the same points are not described here.
(1) Structure of Transparent Film The structure of the transparent film of Embodiment 5 is described with reference to FIG. 10 and FIG. 11. FIG. 10 is a schematic plan view of a transparent film of Embodiment 5. FIG. 11 is a schematic cross-sectional view of a cross section taken along the line D-D' in FIG. 10. As illustrated in FIG. 10 and FIG. 11, a transparent film 21b includes the base film 22, the ionic liquid 10, and hydrophilic fine particles 23. The hydrophilic fine particles 23 are placed in the gaps 25 between the projections 24, and are in contact with the adjacent projections 24 at two sites. That is, the hydrophilic fine particles 23 are in contact with both of the adjacent projections 24, and the total number of the contact sites is two.

The hydrophilic fine particles 23 may be, for example, those obtained by hydrophilizing a compound such as titanium oxide ($TiO_2$) or aluminum oxide ($Al_2O_3$), or silica fine particles. For sufficient increase in the hydrophilicity, silica fine particles are preferred.

The hydrophilic fine particles 23 may be surface-modified with ion-exchange groups. In this case, the hydrophilic fine particles 23 exhibit an increased surface tension in a measurement with water, leading to a small contact angle of water, so that the hydrophilicity of the hydrophilic fine particles 23 can be further increased. Also, by chemically bonding at least one of the paired ions in the ionic liquid 10 to the ionic functional groups on the surfaces of the hydrophilic fine particles 23, the ionic liquid 10 can be sufficiently prevented from being wiped off. Furthermore, even in the case that water droplets are generated by condensation on the surfaces of the hydrophilic fine particles 23, the ionic functional groups on the surfaces of the hydrophilic fine particles 23 lose touch with the surfaces to become ions, causing freezing-point depression to decrease the temperature at which frost forms. Thereby, in the case of applying such a transparent film to the window of a showcase freezer, for example, the lower end of the operating temperature limit can be further decreased. Examples of the ion-exchange groups include —COOH groups, —N$^+$(—R1)$_3$ groups (R1 represents a H atom or a functional group having an alkyl group, an ester bond, or an ether bond in a molecule, for example; three R1's bonded to the N atom may be the same as or different from each other, and only one of them or all of them may be different), and —SO$_3$— groups.

The shape of the hydrophilic fine particles 23 may be any shape such as a sphere, a pillar (fibrous shape), or an oval sphere. For efficient placement of the hydrophilic fine particles 23, the shape of the hydrophilic fine particles 23 is preferably a sphere as illustrated in FIG. 11.

The particle size of the hydrophilic fine particles 23 may be any size that can retain the hydrophilic fine particles 23 within the gaps 25 between the projections 24. For efficient placement of the hydrophilic fine particles 23, the particle size is preferably in the range of 10% to 50%, more preferably in the range of 20% to 30%, of the pitch P3 of the projections 24. The particle size of the hydrophilic fine particles 23 as used herein refers to the average of the particle sizes of 20 hydrophilic fine particles on SEM photographs (plan picture and cross-sectional picture) taken with the SEM (trade name: S-4700) available from Hitachi, Ltd. as a measurement device. Here, hydrophilic fine particles with a defect or deformation are excluded from the 20 hydrophilic fine particles. The particle size of the hydrophilic fine particles 23 as used herein is the maximum length of the lengths in all the directions of each of the hydrophilic fine particles 23. For example, in the case that the hydrophilic fine particles 23 each have a spherical shape, the particle size is the length corresponding to the diameter of the particle, while in the case that the hydrophilic fine particles 23 each have an oval spherical shape, the particle size is the longest of the major axis and a diameter in the direction perpendicular to the major axis.

The hydrophilic fine particles 23 preferably exhibit a surface tension equal to or higher than the surface tension of the projections 24 in a measurement with water. With an increased surface tension, the contact angle decreases to further increase the hydrophilicity of the hydrophilic fine particles 23.

Although FIG. 11 illustrates the configuration in which part of each of the hydrophilic fine particles 23 protrudes from the surface of the ionic liquid 10, the hydrophilic fine particles 23 may be positioned under the surface of the ionic liquid 10. For efficient utilization of the hydrophilic function of the hydrophilic fine particles 23, the configuration as illustrated in FIG. 11 in which part of each of the hydrophilic fine particles 23 protrudes from the surface of the ionic liquid 10 is preferred.

FIG. 11 illustrates a configuration in which one hydrophilic fine particle 23 is placed in each gap 25 between the projections 24, but the transparent film may have a configuration in which multiple hydrophilic fine particles 23 are placed in each gap 25 between the projections 24. In this case, each hydrophilic fine particle 23 is preferably in contact with a projection 24, and is more preferably in contact with both of the adjacent projections 24 such that the total number of contact sites of each hydrophilic fine particle 23 is at least two. Also, although FIG. 11 illustrates a configuration in which the total number of contact sites between a hydrophilic fine particle 23 and the adjacent projections 24 is two, the total number of contact sites may be one or may be three or more. Examples of the configuration in which the total number of contact sites is three or more include, for example in FIG. 11, a configuration in which the hydrophilic fine particles 23 have projections and recesses on the surface, and a configuration in which the bottoms of the craps 25 between the projections 24 are horizontal and spherical hydrophilic fine particles 23 are placed in the gaps. The number of contact sites between the hydrophilic fine particles 23 and the projections 24 herein is determined from an SEM photograph (plan picture) taken with the SEM (trade name: S-4700) available from Hitachi, Ltd. as a measurement device. Specifically, in the case that the hydrophilic fine particles 23 are aligned alongside the respective gaps 25 between the projections 24 (alongside both of the adjacent projections 24) with one particle in each gap on the SEM photograph, the total number of contact sites is determined to be two or more, while in the case that the hydrophilic fine particles 23 overlap each other and are aligned alongside one of the adjacent projections 24, the number of contact sites is determined to be one.

It is clear that the transparent film of Embodiment 5 can achieve the same effects as that of Embodiment 4. With the hydrophilic function of the hydrophilic fine particles 23 as well as the ionic liquid 10, the transparent film can provide an increased rate for water to spread, and therefore can achieve a better anti fog property. Also, the transparent film can also achieve the following effects (i) to (iii).

(i) Since the hydrophilic fine particles 23 are placed in the respective gaps 25 between the adjacent projections 24 while being in contact with the adjacent projections 24 at two sites, the intermolecular forces (Van der Waals forces) are present at the contact sites between the hydrophilic fine particles 23 and the projections 24. Also, since the weight of the hydrophilic fine particles 23 is small, the forces of gravity acting on the hydrophilic fine particles 23 are weaker than the intermolecular forces. Hence, the hydrophilic fine particles 23 can be sufficiently strongly fixed in the respective gaps 25 between the projections 24 without a component such as a binder.

(ii) Since the above effect (i) enables fixation of the hydrophilic fine particles 23 in the respective gaps 25 between the projections 24 without a component such as a binder, the hydrophilic fine particles 23 can be effectively utilized without hindrance to the hydrophilic function.

(iii) Since the intermolecular forces are present between the hydrophilic fine particles 23 and the projections 24, the hydrophilic fine particles 23 are not wiped off. Also, for example, in the case that the material of the projections 24 is resin (polymer), the hydrophilic functional groups present on the surfaces of the hydrophilic fine particles 23 are chemically bonded to the above resin (polymer), and are therefore prevented from being wiped off. Moreover, for example, in the case that the transparent film 21b including the projections 24 having a height of 200 nm and formed at a pitch P3 of 200 nm is wiped with a cloth having a minimum fiber size of 400 nm, the fibers of the cloth cannot enter the gaps 25 between the projections 24 and the hydrophilic fine particles 23 are not wiped off.

(2) Process of Producing Transparent Film

Figure 12:
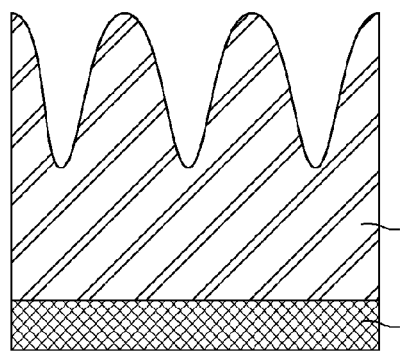
FIG. 12 includes schematic cross-sectional views for describing the process of producing the transparent film of Embodiment 5 (steps a to e).
Figure 12:
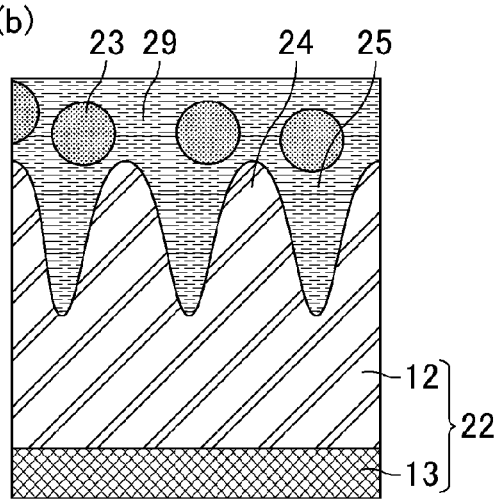
Figure 12:
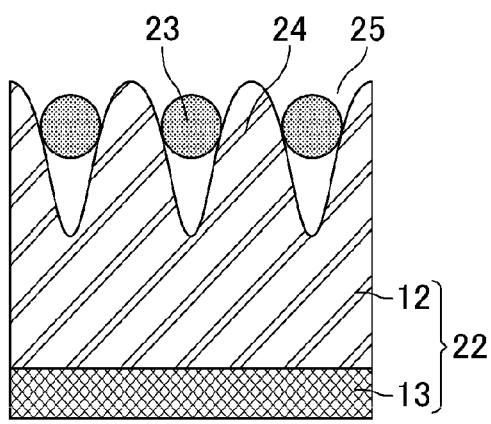
Figure 12:
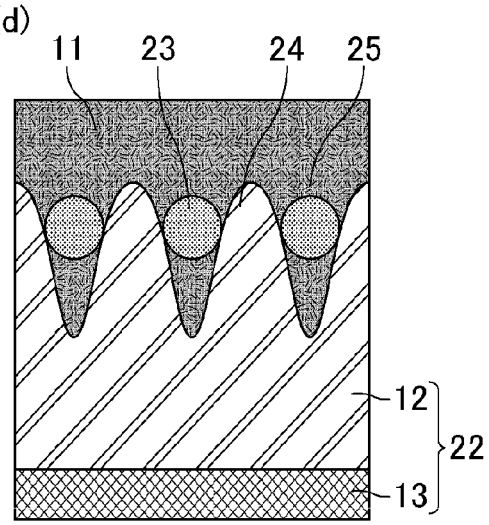
Figure 12:
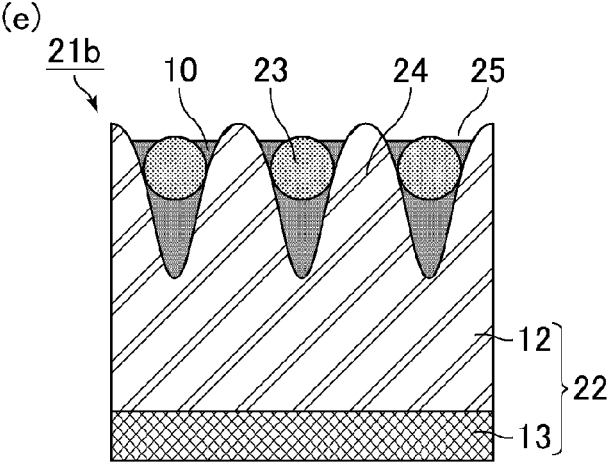

The process of producing the transparent film of Embodiment 5 is described with reference to FIG. 12. FIG. 12 includes schematic cross-sectional views for describing the process of producing the transparent film of Embodiment 5 (steps a to e).

(a) Production of Base Film

First, a substrate is produced by sequentially forming a film of silicon dioxide ($SiO_2$) (insulating layer) and a film of pure aluminum on an aluminum base material. At this time, using the aluminum base material having a roll shape, for example, enables continuous formation of the insulating layer and the pure aluminum layer. The pure aluminum layer formed on the surface of the substrate is then alternately repetitively anodized and etched, so that a female mold of the moth-eye structure is produced. Meanwhile, a film is prepared in which the resin layer 12 is attached to the TAC film 13. The female mold pattern of the moth-eye structure is transferred to the photo-curable resin (resin layer 12) by optical nanoimprinting, whereby the base film 22 as illustrated in FIG. 12(a), i.e., an anti-reflection film having a moth-eye structure, is produced.

(b) Application of Dispersion

As illustrated in FIG. 12(b), a dispersion 29 in which the hydrophilic fine particles 23 are dispersed in a solvent is applied to the base film 22. The solvent in the dispersion 29 can be, for example, water, ethanol, an alcohol-based solvent (e.g., methyl alcohol), or an ester-based solvent (e.g., ethyl acetate, butyl acetate). The concentration of the hydrophilic fine particles 23 in the dispersion 29 is not particularly limited, but the hydrophilic fine particles 23 are preferably monodispersed. For monodispersion of the hydrophilic fine particles 23, the solvate stability is important, and the solvent is preferably water. For example, in the case that the solvent used is water and the hydrophilic fine particles 23 used are silica fine particles, the —OH groups on the surfaces of the silica fine particles may be replaced by ionic dissociation groups such as —COOH groups or $N^+R2R3R4R5$ groups, for fusion with water. The $N^+R2R3R4R5$ groups represent quaternary ammonium cations (R2, R3, R4, and R5 are the same or different functional groups. The functional groups are preferably C0-C2 short alkyl groups from the viewpoint of hydrophilicity. Preferably, the functional groups are free from fluorine atoms that may deteriorate the hydrophilicity. Also preferably, the functional groups may include a polar group such as a —OH group, —COOH group, ester bond, or ether bond. The functional groups may also have a structure in which a nitrogen atom is incorporated in a cyclic compound, such as an imidazole group). The shape of the hydrophilic fine particles 23 may be any shape such as a sphere, a pillar (fibrous shape), or an oval sphere. For efficient placement of the hydrophilic fine particles 23, the shape of the hydrophilic fine particles 23 is preferably a sphere. The particle size of the hydrophilic fine particles 23 may be any size that can retain the hydrophilic fine particles 23 within the gaps 25 between the projections 24. For efficient placement of the hydrophilic fine particles 23, the particle size is preferably in the range of 10% to 50%, more preferably in the range of 20% to 30%, of the pitch P3 of the projections 24. The method for applying the dispersion 29 may be any method such as a method of dropping a given amount of the dispersion in the given region of the base film 22. The application region and amount of the dispersion 29 can appropriately be adjusted in accordance with the specifications of the base film 22 (e.g., shape of the projections 24, the depth of the gaps 25 between the projections 24).

(c) Drying of Dispersion

The applied dispersion 29 is dried to evaporate the solvent. As a result, as illustrated in FIG. 12(c), the solvent is completely evaporated to leave the hydrophilic fine particles 23 to adhere to the gaps 25 between the projections 24. The method for drying the dispersion 29 may be any method such as a method of performing the drying in a typical drying furnace, or a method of leaving the workpiece in a clean bench.

(d) Application of Solution

After the above process (c), as illustrated in FIG. 12(d), the solution 11 in which the ionic liquid 10 and a solvent are mixed is applied to the base film 22. The solvent in the solution 11 can be, for example, water (pure water). The concentration of the ionic liquid 10 in the solution 11 is not particularly limited, and may appropriately be determined in consideration of the amount of the ionic liquid 10 to be placed in the gaps 25 between the projections 24. The method for applying the solution 11 may be any method such as a method of applying a given amount of the solution to the base film 22 with a common 11 can appropriately be adjusted in accordance with the specifications of the base film 22 (e.g., shape of the projections 24, the depth of the gaps 25 between the projections 24).

(e) Drying of Solution

The applied solution 11 is dried to evaporate the solvent. As a result, as illustrated in FIG. 12(e), the solvent is completely evaporated to leave the ionic liquid 10 to be placed in the gaps 25 between the projections 24, whereby a transparent film 21b is completed. The method for drying the solution 11 may be any method such as a method of performing the drying in a typical drying furnace.

Hereinafter, examples are described in which the transparent film of Embodiment 5 was actually produced.

Example 8

Example 8 describes the case in which hydrophilic fine particles surface-modified with ion exchange groups were placed in the gaps between the projections in Example 6. The process of producing a transparent film of Example 8 was as follows.

(a) Production of Base Film

The base film 22 was produced by the same procedure as that in Example 6. The base film 22 had the same specifications as that in Example 6.

(b) Application of Dispersion

The dispersion 29 was applied to the base film 22. In the dispersion 29, the hydrophilic fine particles 23 used were polymer latex fine particles (trade name: micromer, model: 01-02-501) available from Corefront Corporation, and the solvent used was water. These polymer latex fine particles are silica fine particles surface-modified with —COOH groups (ion-exchange groups). The concentration of the hydrophilic fine particles 23 was 10 mg/ml, the particle size thereof was 50 nm (average), and the shape thereof was a sphere. The dispersion 29 was applied with a high-performance fully automatic applicator available from COTEC.

(c) Drying of Dispersion

The dispersion 29 was dried at 120° C. for 30 minutes. The dispersion 29 was dried in an explosion-proof dryer (trade name: SKE-202) available from Shimakawa Seisakusyo Co., Ltd.

(d) Application of Solution

After the above process (c), the solution 11 was applied to the base film 22 by the same procedure as that in Example 6. The solution 11 had the same specifications (ionic liquid 10 and solvent) as that in Example 6.

(e) Drying of Solution

The solution 11 was dried the same procedure as that in Example 6. As a result, a transparent film of Example 8 was completed. The ionic liquid 10 was placed up to a position corresponding to 60% of the depth of the gaps 25 between the projections 24.

Comparative Example 5

Comparative Example 5 describes the case in which a hydrophobic ionic liquid was used in the configuration of Example 6. Since the transparent film and the production process thereof in Comparative Example 5 are the same as those in Example 6 except for this change, the same points are not described here. The term hydrophobic ionic liquid as used herein means that the ionic liquid is insoluble in water.

In the solution used for production of the transparent film of Comparative Example 5, the ionic liquid used was an ionic liquid (trade name: N,N-diethyl-N-methyl-N-(2-methoxyethyl)ammonium bis(trifluoromethanesulfonyl)imide) available from Kanto Chemical Co., Inc., and the solvent used was ethanol. The concentration of the ionic liquid in the whole amount of the solution was 2.5%.

The transparent film of Comparative Example 5 containing the hydrophobic ionic liquid could not allow water to spread, thereby exhibiting an inferior anti-fog property.

Comparative Example 6

Comparative Example 6 describes the case in which the structure of the base film in Example 6 was changed.

(1) Structure of Transparent Film

Figure 13:
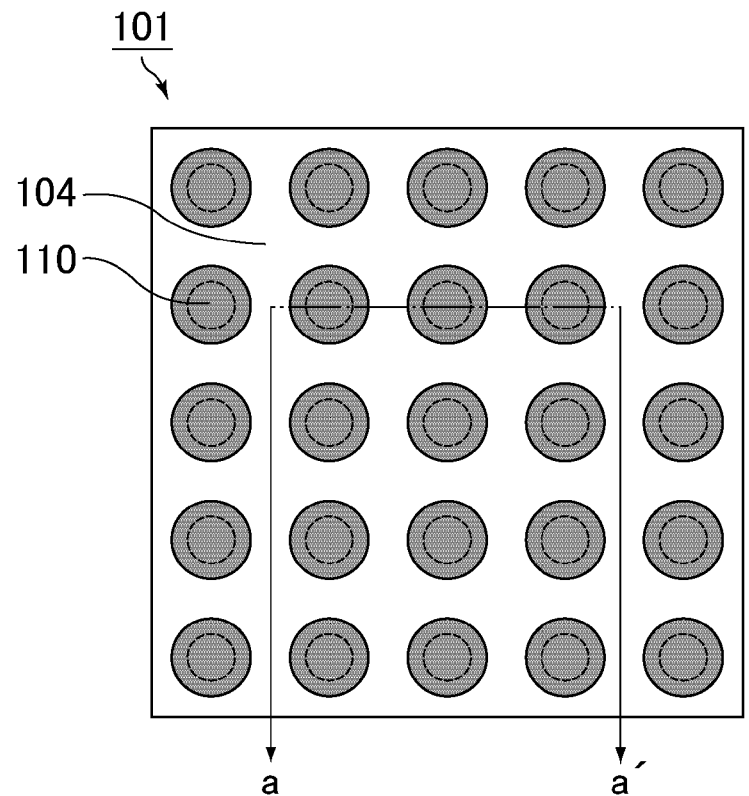
FIG. 13 is a schematic plan view of a transparent film of Comparative Example 6.
Figure 14:
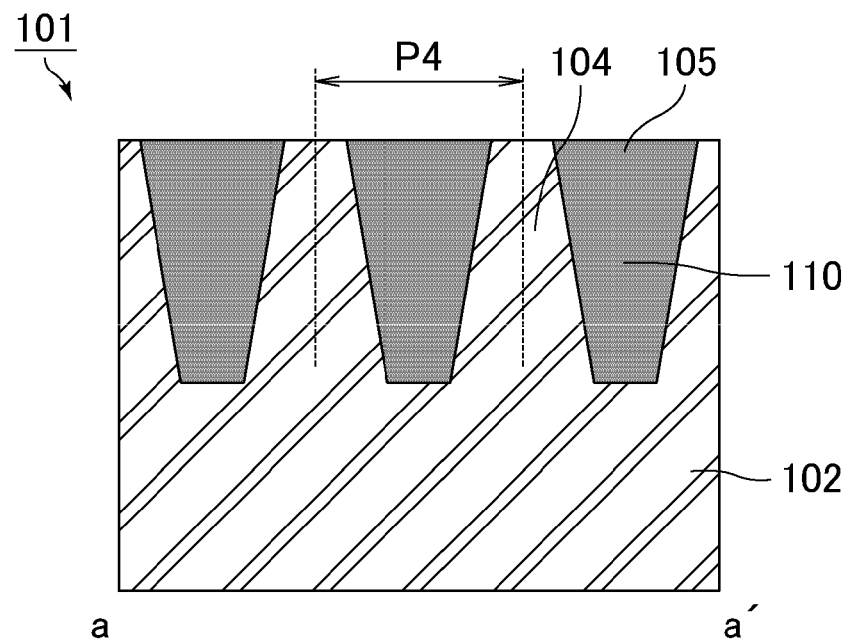
FIG. 14 is a schematic cross-sectional view of a cross section taken along the line a-a' in FIG. 13.

The structure of the transparent film of Comparative Example 6 is described with reference to FIG. 13 and FIG. 14. FIG. 13 is a schematic plan view of a transparent film of Comparative Example 6. FIG. 14 is a schematic cross-sectional view of a cross section taken along the line a-a' in FIG. 13. As illustrated in FIG. 13 and FIG. 14, a transparent film 101 includes a base film 102 and an ionic liquid 110. The base film 102 includes recesses (gaps 105 between projections 104) arranged in a discontinuous (without forming channels), separate pattern. The ionic liquid 110 is placed in the gaps 105 between the projections 104.

(2) Process of Producing Transparent Film

Figure 15:
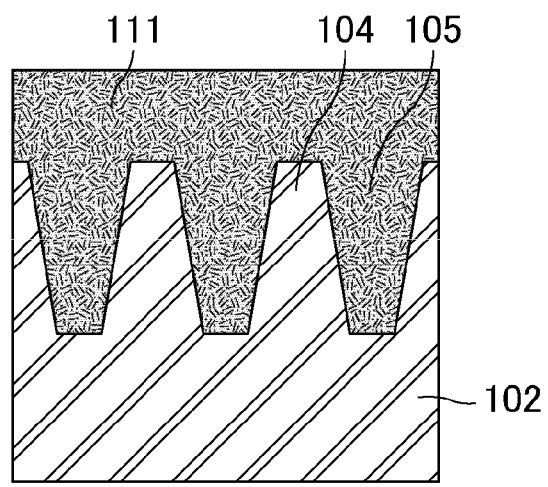
FIG. 15 includes schematic cross-sectional views for describing the process of producing the transparent film of Comparative Example 6 (steps a to c).
Figure 15:
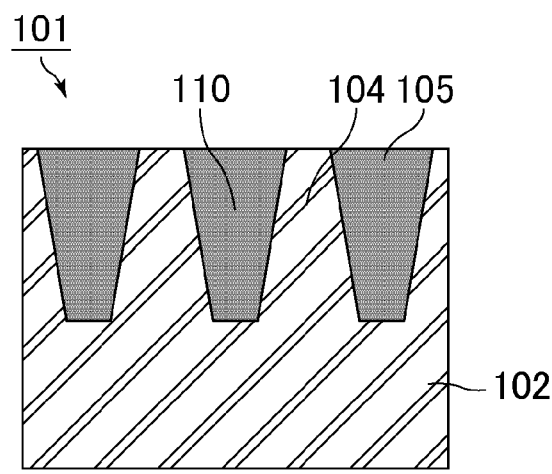

The process of producing the transparent film of Comparative Example 6 is described with reference to FIG. 15. FIG. 15 includes schematic cross-sectional views for describing the process of producing the transparent film of Comparative Example 6 (steps a to c).

(a) Production of Base Film

First, a mold (model: PIP80-140/240) available from Soken Chemical & Engineering Co., Ltd. was prepared as a mold for producing the base film 102. The mold had the following specifications.

Shape: Pillars in grid pattern
Pitch of pattern: 250 nm
Height of projections (depth of recesses): 250 nm The pattern of a mold obtained by connecting four molds with the above specifications was transferred to a photocurable resin by optical nanoimprinting, whereby a base film 102 as illustrated in FIG. 15(a) was produced. The base film 102 had the following specifications.

Cross-sectional shape of gaps 105 between projections 104: inverted trapezoid
Pitch P4 of projections 104: 250 nm
Height of projections 104 (depth of gaps 105 between projections 104): 250 nm
Total thickness of base film 102 (including height of projections 104): 6 μm (b) Application of Solution As illustrated in FIG. 15(b), a solution 111 in which the ionic liquid 110 and a solvent were mixed was applied to the base film 102. In the solution 111, the ionic liquid 110 used was an ionic liquid (trade name: N,N-diethyl-N-methyl-N-(2-methoxyethyl)ammonium tetrafluoroborate, melting point: 9° C.) available from Kanto Chemical Co., Inc., and the solvent used was water (pure water). The concentration of the ionic liquid 110 in the whole amount of the solution 111 was 2.5%. The solution 111 was applied with a high-performance fully automatic applicator available from COTEC while the thickness of the applied solution 111 was adjusted to 2 μm.

(c) Drying of Solution

The applied solution 111 was dried at 120° C. for 30 minutes. The solution 111 was dried in an explosion-proof dryer (trade name: SKE-202) available from Shimakawa Seisakusyo Co., Ltd. As a result, as illustrated in FIG. 15(c), the solvent was completely evaporated to leave the ionic liquid 110 to be placed in the gaps 105 between the projections 104, whereby a transparent film 101 was completed.

In the transparent film of Comparative Example 6, the base film 102 includes the gaps 105 between the projections 104 arranged in a discontinuous (without forming channels) separate pattern. Hence, the transparent film provides a low rate for water to spread, thereby exhibiting an inferior anti-fog property. Also, since the ionic liquid 110 does not become uniformly distributed again after the wiping, poor appearance due to the uneven wiping cannot be avoided, and therefore the wiping property is inferior.

[Evaluation Result 3]

The results of evaluating the anti-fog property, condensation property, frosting property, and wiping property of transparent films of Examples 6 to 8 and Comparative Examples 5 and 6 are shown in Table 3.

The anti-fog property was evaluated by measuring the rate at which a water droplet dropped onto the sample of each example spread. Specifically, a 80-μl droplet of pure water was prepared with a microsyringe (trade name: Ito microsyringe MS-250) available from Ito Corporation. The water droplet was brought into contact with the sample of each example, and the time (unit: second) for the droplet to move 10 mm on the surface of the sample was recorded. This time was used as an index of evaluation of the anti-fog property.

The condensation property was evaluated by determining whether or not water droplets generated by condensation were observed on the surface of the sample of each example taken out of a refrigerator. Specifically, first, the sample of each example was attached to a 3-mm-thick black acrylic plate, and the product was left in a refrigerator set to 5° C. for 20 minutes. The product was then taken out to the environment with a temperature of 25° C., a humidity of 60%, and an illuminance of 200 lx. Whether or not water droplets generated by condensation were observed on the surface of the sample of each example was evaluated. The evaluation indexes used were as follows: good=no water droplets were observed; fair=water droplets were observed but disappeared after a few minutes; and poor=water droplets were observed and did not disappear. The refrigerator used was a thermostatic bath (trade name: ECONAS series CH43-12) available from Nagano Science Co., Ltd.

The frosting property was evaluated by measuring the temperature (melting temperature) at which the frost on the sample of each example taken out of a freezer turned into water droplets. Specifically, first, the sample of each example was attached to a 3-mm-thick black acrylic plate, and the product was left in a freezer set to −20° C. for 20 minutes. The product was then taken out to the environment with a temperature of 25° C., a humidity of 60%, and an illuminance of 200 lx. The change in the surface temperature of each sample was measured to record the temperature at which the melting started. The freezer used was the thermostatic bath (trade name: ECONAS series CH43-12) available from Nagano Science Co., Ltd. The surface temperature was measured with a radiation thermometer (trade name: DT-8855) available from Sato Shoji Inc.

The wiping property was evaluated by determining whether or not poor appearance due to uneven wiping after wiping of the sample of each example was eliminated after a lapse of time. Specifically, the sample of each example was attached to a 3-mm-thick black acrylic plate. The sample of each example was then wiped three times in one direction with a non-woven fabric (trade name: BEMCOT) available from Asahi Kasei Fibers Corp. The sample was left in an environment with a temperature of 25° C. and a humidity of 60% for one day, followed by observation of the sample at an illuminance of 200 lx to determine whether or not the poor appearance due to uneven wiping was eliminated. The evaluation indexes used were as follows: good=poor appearance due to uneven wiping was eliminated; and poor=poor appearance due to uneven wiping was not eliminated.

TABLE 3

| | Anti-fog property (sec) | Condensation property | Frosting property (° C.) | Wiping property |
|---|---|---|---|---|
| Example 6 | 12 | Good | 0 | Good |
| Example 7 | 10 | Good | −3 | Good |
| Example 8 | 8 | Good | −2 | Good |
| Comparative Example 5 | Droplet did not spread | Poor | 0 | Good |
| Comparative Example 6 | 120 | Fair | −1 | Poor |

As shown in Table 3, all the samples of Examples 6 to 8 had a better anti-fog property than those of Comparative Examples 5 and 6. In particular, the sample of Example 8 allowed a water droplet to spread at a higher rate than those of Examples 6 and 7, and therefore had a better anti-fog property. In contrast, the sample of Comparative Example 5 did not allow a water droplet to spread, and therefore had a much worse anti-fog property than those of Examples 6 to 8. The sample of Comparative Example 6 provided a lower rate for a water droplet to spread than those of Examples 6 to 8, and therefore had an inferior anti-fog property.

As shown in Table 3, all the samples of Examples 6 to 8 exhibited a better condensation property than those of Comparative Examples 5 and 6. In contrast, water droplets generated by condensation did not disappear from the sample of Comparative Example 5, and thus the condensation property in Comparative Example 5 was much worse than those in Examples 6 to 8. On the sample of Comparative Example 6, water droplets generated by condensation disappeared after a few minutes, but the condensation property in Comparative Example 6 was still inferior to those in Examples 6 to 8.

As shown in Table 3, the samples of Examples 7 and 8 exhibited a lower melting temperature and thus a better frosting property than that of Example 6. This is because the melting point of the ionic liquid was low in the transparent film of Example 7, and the hydrophilic fine particles in the transparent film of Example 8 were surface-modified with ion-exchange groups.

As shown in Table 3, all the samples of Examples 6 to 8 had a wiping property equal to or higher than that in Comparative Examples 5 and 6.

[Additional Remarks]

Hereinafter, examples of preferred features of the second transparent film of the present invention are described. The examples may appropriately be combined within the spirit of the present invention.

The ionic liquid may have a melting point of 0° C. or lower. With such a melting point, the ionic liquid remains as a liquid even in the case that water droplets are generated by condensation on the surface of the ionic liquid. The ionic liquid therefore mixes with the water droplets generated by the condensation, so that ionic functional groups on the surface of the ionic liquid lose touch with the surface to become ions, causing freezing-point depression to decrease the temperature at which frost forms. Thereby, in the case of applying the second transparent film of the present invention to the window of a showcase freezer, for example, the lower end of the operating temperature limit can be further decreased.

The second transparent film of the present invention may include hydrophilic fine particles in the gaps between the projections. With the hydrophilic function of the hydrophilic fine particles as well as the ionic liquid, the transparent film can provide a further increased rate for water to spread, and therefore can achieve a better anti-fog property.

The hydrophilic fine particles may each have a particle size in the range of 10% to 50% of the pitch of the projections. In this case, the hydrophilic fine particles can be efficiently placed in the gaps between the projections.

The hydrophilic fine particles may be silica fine particles. In this case, the hydrophilicity of the second transparent film of the present invention is sufficiently increased. As a result, the anti-fog property can be sufficiently increased.

The hydrophilic fine particles may be surface-modified with ion-exchange groups. In this case, the hydrophilic fine particles exhibit an increased surface tension in a measurement with water. Accordingly, the contact angle of water on the hydrophilic fine particles decreases to further increase the hydrophilicity of the hydrophilic fine particles. Also, by chemically bonding at least one of the paired ions in the ionic liquid to the ionic functional groups on the surfaces of the hydrophilic fine particles, the ionic liquid can be sufficiently prevented from being wiped off. Furthermore, even in the case that water droplets are generated by condensation on the surfaces of the hydrophilic fine particles, the ionic functional groups on the surfaces of the hydrophilic fine particles lose touch with the surfaces to become ions, causing freezing-point depression to decrease the temperature at which frost forms. Thereby, in the case of applying the second transparent film of the present invention to the window of a showcase freezer, for example, the lower end of the operating temperature limit can be further decreased.

The projections may each have a hydrophilic surface. In this case, the hydrophilicity of the second transparent film of the present invention is sufficiently increased, and thereby the anti-fog property can be sufficiently increased.

The pitch of the projections may be in the range of 100 nm to 400 nm. In this case, optical phenomena such as a moiré pattern and iridescent unevenness can be sufficiently prevented.

The projections may have an aspect ratio in the range of 0.8 to 1.5. Thereby, in the case that the ends of the projections protrude from the surface of the ionic liquid, favorable reflectance characteristics can be achieved with the protruded portions of the projections. Also, optical phenomena such as a moiré pattern and iridescent unevenness can be sufficiently prevented.

REFERENCE SIGNS LIST 1a, 1b, 21a, 21b, 101: transparent film
2a, 2b, 22, 102: base film
3, 23: hydrophilic fine particles
4a, 4b, 24, 104: projection
5a, 5b, 25, 105: gaps between projections
6, 26: branched projection
7a, 7b: space
8: solvent
9, 29: dispersion
10, 110: ionic liquid
11, 111: solution
12: resin layer
13: TAC film
P1, P2, P3, P4: pitch

The invention claimed is:
1. A transparent film comprising:
a base film provided on a surface with projections formed at a pitch equal to or shorter than the wavelength of visible light; and hydrophilic fine particles each having a particle size in the range of 15% to 50% of the pitch of the projections, the hydrophilic fine particles being held in gaps between the projections while being in contact with the projections, the hydrophilic fine particles held in the gaps between the projections being separated by spaces from bottoms of the gaps, the spaces forming channels on the surface.

2. The transparent film according to claim 1, wherein the hydrophilic fine particles are in contact with the adjacent projections at least at two sites.

3. The transparent film according to claim 2, wherein the number of the hydrophilic fine particles being in contact with the adjacent projections at least at two sites as a percentage of all the hydrophilic fine particles is in the range of 30% to 100%.

4. The transparent film according to claim 1, wherein the hydrophilic fine particles are silica fine particles.

5. The transparent film according to claim 1, wherein the hydrophilic fine particles are surface-modified with ion-exchange groups.

6. The transparent film according to claim 1, wherein the projections each have a hydrophilic surface.

7. The transparent film according to claim 1, wherein the hydrophilic fine particles exhibit a surface tension equal to or higher than the surface tension of the projections in a measurement with water.

8. The transparent film according to claim 1, wherein the pitch of the projections is in the range of 100 nm to 400 nm.

9. The transparent film according to claim 1, wherein the projections have an aspect ratio in the range of 0.8 to 1.5.

10. A method for producing the transparent film according to claim 1, comprising the steps of:

applying a dispersion with the hydrophilic fine particles dispersed in a solvent to the base film; and drying the applied dispersion to evaporate the solvent.

11. A transparent film comprising:

a base film provided on a surface with projections formed at a pitch equal to or shorter than the wavelength of visible light, with gaps between the projections forming channels; and a hydrophilic ionic liquid placed in the gaps between the projections.

12. The transparent film according to claim 11, wherein the ionic liquid has a melting point of 0° C. or lower.

13. The transparent film according to claim 11, further comprising hydrophilic fine particles in the gaps between the projections.

14. The transparent film according to claim 13, wherein the hydrophilic fine particles each have a particle size in the range of 10% to 50% of the pitch of the projections.

15. The transparent film according to claim 13, wherein the hydrophilic fine particles are silica fine particles.

16. The transparent film according to claim 13, wherein the hydrophilic fine particles are surface-modified with ion-exchange groups.

17. The transparent film according to claim 11, wherein the projections each have a hydrophilic surface.

18. The transparent film according to claim 11, wherein the pitch of the projections is in the range of 100 nm to 400 nm.

19. The transparent film according to claim 11, wherein the projections have an aspect ratio in the range of 0.8 to 1.5.

20. A method for producing the transparent film according to claim 11, comprising the steps of:

applying a solution of the ionic liquid and a solvent to the base film; and drying the applied solution to evaporate the solvent.

* * * * *